(12) United States Patent
Agrawal et al.

(10) Patent No.: US 8,325,902 B2
(45) Date of Patent: *Dec. 4, 2012

(54) REROUTING ONGOING TELECOMMUNICATIONS TO A USER

(75) Inventors: Kavita K. Agrawal, Boulder, CO (US); William K. Bodin, Austin, TX (US); Gregory W. Rybczynski, Pflugerville, TX (US); Derral C. Thorson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1136 days.

This patent is subject to a terminal disclaimer.

(21) Appl. No.: 12/059,498

(22) Filed: Mar. 31, 2008

(65) Prior Publication Data

US 2008/0175368 A1 Jul. 24, 2008

Related U.S. Application Data

(63) Continuation of application No. 10/981,298, filed on Nov. 4, 2004, now Pat. No. 7,436,945.

(51) Int. Cl.
*H04M 3/42* (2006.01)
(52) U.S. Cl. .......... 379/211.02; 379/211.01; 379/201.01
(58) Field of Classification Search ............. 379/211.01, 379/201.01
See application file for complete search history.

(56) References Cited

U.S. PATENT DOCUMENTS

| 6,512,478 B1 | 1/2003 | Chien |
| 6,703,930 B2 | 3/2004 | Skinner |
| 2002/0062251 A1 | 5/2002 | Anandan et al. |
| 2003/0043042 A1 | 3/2003 | Moores, Jr. et al. |
| 2003/0065805 A1* | 4/2003 | Barnes, Jr. .................... 709/231 |
| 2003/0100315 A1 | 5/2003 | Rankin |
| 2003/0138085 A1 | 7/2003 | Forman et al. |
| 2003/0148775 A1 | 8/2003 | Spriestersbach et al. |
| 2003/0220835 A1 | 11/2003 | Barnes, Jr. |
| 2004/0002305 A1 | 1/2004 | Byman-Kivivuori et al. |

FOREIGN PATENT DOCUMENTS

| WO | WO 9707640 A1 | 2/1997 |
| WO | WO 0052498 A1 | 8/2000 |
| WO | WO 0192910 A2 | 6/2001 |

OTHER PUBLICATIONS

Office Action U.S. Appl. No. 12/059,498, Nov. 15, 2010.
Office Action U.S. Appl. No. 12/059,580, Nov. 16, 2010.

* cited by examiner

*Primary Examiner* — Rasha Al Aubaidi
(74) *Attorney, Agent, or Firm* — Brevetto Law Group

(57) ABSTRACT

Rerouting telecommunications to a user including receiving a plurality of RFID signals from an RFID tag located with the user, anticipating a user's future location in dependence upon the RFID signals, selecting a telephony device in dependence upon the anticipated future location, and rerouting an ongoing call to the selected telephony device. In typical embodiments, selecting a telephony device in dependence upon the anticipated future location also includes identifying location based routing preferences for the user. In typical embodiments, selecting a telephony device in dependence upon the anticipated future location also includes identifying device-based routing preferences for the user. In typical embodiments, anticipating a user's future location in dependence upon the RFID signals also includes determining a first user location, determining a second user location, and predicting a user's future location in dependence upon the first user location and the second user location.

33 Claims, 19 Drawing Sheets

REROUTING ONGOING TELECOMMUNICATIONS TO A USER

CROSS-REFERENCE TO RELATED APPLICATION

This application is a continuation application of and claims priority from U.S. patent application Ser. No. 10/981,298, filed on Nov. 4, 2004.

BACKGROUND OF THE INVENTION

1. Field of the Invention

The field of the invention is data processing, or, more specifically, methods, systems, and products for routing telecommunications.

2. Description of Related Art

Conventional telecommunications systems often provide a number of telephony devices on which a user may receive calls in a particular networked environment. Conventional telecommunications systems also provide a call routing to one or more of the individual telephony devices. To route a call to a particular user however, conventional telecommunications system route the call to a particular telephony device most likely to be near the user. For example, a telephone system in an office may route calls for a particular user to the telephony device in the user's office. Most users, however, are not static. That is, most users move about their networked environment. It would be advantageous therefore to route telecommunications to users based upon their location within their networked environment.

SUMMARY OF THE INVENTION

Methods, systems, and products are provided for rerouting telecommunications to a user, the method including receiving a plurality of RFID signals from an RFID tag located with the user, anticipating a user's future location in dependence upon the RFID signals, selecting a telephony device in dependence upon the anticipated future location, and rerouting an ongoing call to the selected telephony device. In typical embodiments, selecting a telephony device in dependence upon the anticipated future location also includes identifying location based routing preferences for the user. In typical embodiments, selecting a telephony device in dependence upon the anticipated future location also includes identifying device-based routing preferences for the user. In typical embodiments, anticipating a user's future location in dependence upon the RFID signals also includes determining a first user location, determining a second user location, and predicting a user's future location in dependence upon the first user location and the second user location.

In typical embodiments, determining a first user location also includes receiving a plurality of RFID signals from the RFID tag at a plurality of RFID reader locations and determining the location of the user in dependence upon the RFID reader locations and a rule. In typical embodiments, determining a first user location also includes receiving a plurality of RFID signals at a plurality of RFID reader locations from the RFID tag, determining for each RFID reader an area of possible locations of the RFID tag, and determining the intersection of the areas of possible locations.

Typical embodiments also include receiving a call and determining that the call is intended for the user. In typical embodiments, determining that the call is intended for the user also include prompting the caller for the name of the user and receiving from the caller the name of the user.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for routing telecommunications. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Exemplary Architecture

Figure 1:
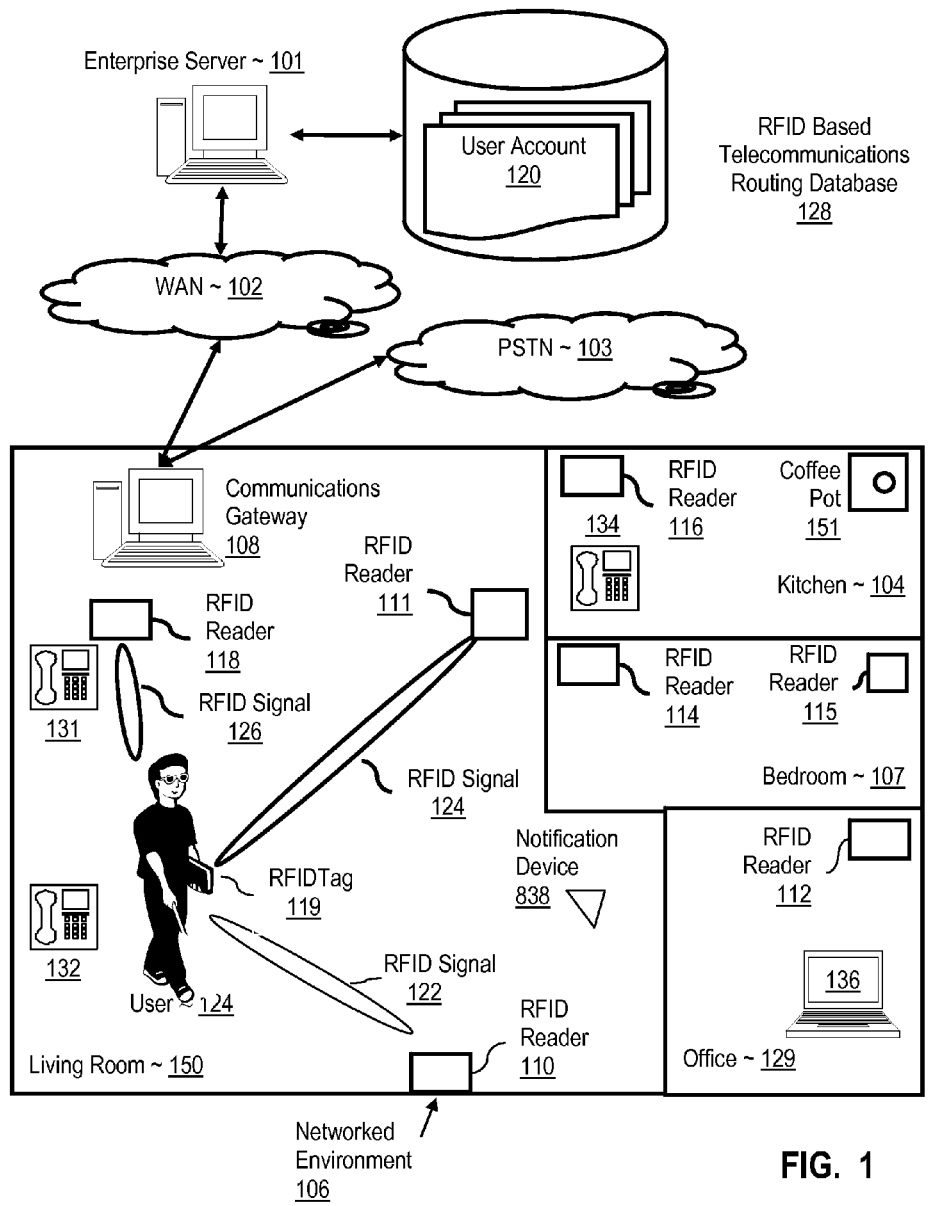
FIG. 1 sets forth a line drawing illustrating an exemplary system for routing telecommunications.

Methods, systems, and computer program products for routing telecommunications are explained with reference to the accompanying drawings, beginning with FIG. 1. FIG. 1 sets forth a line drawing illustrating an exemplary system for routing telecommunications. The term 'telecommunications' in this specification means the art of communicating over a distance by telephony device, telephone, telegraph, radio, or any other device designed to facilitate such communications between users. In this specification a 'telephony device' is any device useful in facilitating telecommunications between users. Telephony device include computers, digital communications equipment, analog communications equipment or any other communications device that will occur to those of skill in the art.

The system of FIG. 1 includes a networked environment (106), which in this example is a networked home environment for a user (124). The description of a networked home environment is for explanation only and not for limitation. In fact, systems for routing telecommunications to a user may be implemented in any networked environment such as a networked office, business, or other environment as will occur to those of skill in the art. Included within the networked home environment of FIG. 1 are RFID readers (118, 111, 110, 116, 114, 112) fixed at different locations within the home. The living room (150) of FIG. 1 has fixed with it three RFID readers (118, 111, and 110). The kitchen (104) of the FIG. 1 has fixed within it one RFID reader (116). The bedroom (107) of FIG. 1 has fixed within it two RFID readers (114, 115). The office (129) has fixed within it one RFID reader (112). In the example of FIG. 1 an RFID tag (119) is located with or attached to the user (124).

"RFID" means Radio Frequency Identification, a technology useful in locating users (124) within the networked environment (106) by use of an antenna, a transceiver, and a transponder or 'tag.' RFID transceivers are treated in this specification as including the electronic devices needed to convert the information in a radio signal into useful computer data; in this specification, therefore, RFID transceivers are referred to as "RFID readers." As the term 'transceiver' implies, however, RFID readers may read and write information to and from RFID transponders. RFID transponders are referred to in this specification as "RFID tags." RFID tags are programmed with RFID identification codes unique to each RFID tag. A unique RFID tag located with the user is used to uniquely locate the user within the networked environment.

An RFID antenna emits radio signals to activate an RFID tag and read and write data to and from the tag. Antennas act as data conduits between tags and transceivers or RFID readers. Antennas are available in a variety of shapes and sizes. An RFID reader typically emits radio waves at power levels and at frequencies that are useful at ranges of anywhere from a few inches to 100 feet or more. When an RFID tag (119) passes through the electromagnetic field of a radio signal from an RFID antenna, the RFID tag detects the reader's activation signal. The reader decodes the data encoded in the tag's integrated circuit, typically a silicon chip.

An RFID device that did not actively transmit to a reader was traditionally known as a 'tag.' An RFID device that actively transmitted to a reader was known as a transponder (TRANSmitter+resPONDER). It has become common in the industry, however, to interchange terminology and refer these devices as either tags or transponders more or less interchangeably. In this specification, for clarity of usage, the term 'tag' is used to refer generally to all RFID devices.

Tags are programmed with data that identifies the tag and therefore the user located with the tag. Tags can be either read-only, volatile read/write, or write once/read many ("WORM") and can be either active or passive. Active tags generally use batteries to power the tag's radio transmitter and receiver. Active tags generally contain more components than do passive tags, so active tags are usually larger in size and more expensive than passive tag. An active tag's memory size varies according to application requirements; some systems operate with up to a megabyte or more of memory. The useful life of an active tag is related to its battery life. Passive tags can be either battery or non-battery operated, according to their intended applications.

Passive tags reflect the RF signal transmitted to them from a reader and add information by modulating the reflected signal to convey identifying or descriptive information stored in computer memory in the tag. A passive tag having a battery usually does not use its battery to boost the energy of the reflected signal. A passive tag typically would use a battery to maintain memory in the tag or power the electronics that enable the tag to modulate the reflected signal. Passive RFID tags often operate without a battery or other power source, obtaining operating power generated from an RFID reader. Passive tags are typically much lighter than active tags, less expensive, and offer a very long operational lifetime. The trade off is that passive RFID tags have shorter read ranges than active tags and require a higher-powered reader.

RFID tags come in a wide variety of shapes and sizes. Animal tracking tags, inserted beneath an animal's skin, can be as small as a pencil lead in diameter and one-half inch in length. Some tags are screw-shaped to identify trees or wooden items, or credit-card shaped for use in access applications. The anti-theft hard plastic tags attached to merchandise in stores are RFID tags.

In the example of FIG. 1, RFID signals (122, 126, and 124), transmitted from RFID readers (118, 111, and 110) activates RFID tag (119), a small form-factor, passive tag located with the user. Tag (119) has stored in computer memory within it at least one unique identifications code or serial number that uniquely identifies the tag and therefore uniquely identifies the user located with the tag. The RFID readers are coupled for data communications with the communications gateway (108). "Coupled for data communications" means any form of data communications, wireless, 802.11b, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of connection for data communications as will occur to those of skill in the art. Couplings for data communications include networked couplings for data communications. Examples of networks useful with various embodiments of the invention include cable networks, intranets, extranets, internets, local area networks, wide area networks, and other network arrangements as will occur to those of skill in the art. The use of any networked coupling among television channels, cable channels, video providers, telecommunications sources, and the like, is well within the scope of the present invention.

The exemplary communications gateway (108) of FIG. 1 is capable of receiving from the RFID readers an indication that the RFID reader has received an RFID signal from an RFID tag located with the user. In many embodiments of the present invention, the RFID readers are advantageously wirelessly coupled for data communications with the communications gateway (108). In many alternative embodiments, the RFID readers transmit an indication that an RFID signal was received by the RFID reader to a communications application running on the communications gateway using various protocols such as Bluetooth, 802.11, HTTP, WAP, or any other protocol that will occur to those of skill in the art.

The exemplary communications gateway (108) of FIG. 1 is also capable of determining the location of the user within the networked environment (106) and routing calls to a selected telephony device (132, 131, 134, 136) in dependence upon the user's location. As discussed in more detail below with reference to FIGS. 6, 7, and 8, determining the location of the user in dependence upon RFID signals can be carried out by near field sensing of the user's tag at fixed locations within the networked environment or through the user of trilateration. The exemplary descriptions of near field sensing and trilateration are for explanation and not for limitation. In fact, there are many ways of determining the location of the user in dependence upon RFID signals that will occur to those of skill in the art and all such ways are will within the scope of the present invention.

The exemplary communications gateway (108) of FIG. 1 is also coupled for data communications to a wide area network (102) to an enterprise server (101) which is coupled for data communications to a RFID-based telecommunications routing database (128) having stored within it a user account (120) record for the user (124) that contains preference data and other information useful to route telecommunication to a device within the networked environment in dependence upon the user's location within the networked environment. The communications gateway (108) supports both traditional telecommunications functions through a PSTN Network ("Public Switched Telephone Network") (103) as well as packet switched telephony through the WAN (102) such as for example VoIP ("Voice Over Internet Protocol") telecommunications. The exemplary communications gateway (108) of FIG. 1 communications gateway of FIG. 1 is an OSGi-enabled gateway capable of telecommunications routing within the networked domain. OSGi Stands for 'Open Services Gateway Initiative.' The OSGi specification is a Java-based application layer framework that provides vendor neutral application and device layer APIs and functions for various devices using arbitrary communication protocols operating in networks in homes, cars, and other environments. OSGi works with a variety of networking technologies like Ethernet, Bluetooth, the 'Home, Audio and Video Interoperability standard' (HAVi), IEEE 1394, Universal Serial Bus (USB), WAP, X-10, Lon Works, HomePlug and various other networking technologies. The OSGi specification is available for free download from the OSGi website at www.osgi.org. Telephony APIs ("Application Programming Interface") are available to implement call routing with the exemplary communications gateway of FIG. 1. Examples of telephony APIs include Java Telephony API available from Sun Microsystems, Inc., CallPath API available from IBM®, and others that will occur to those of skill in the art.

The system for routing telecommunications to a user of FIG. 1 is capable of receiving a call through a PSTN network (103) or a packet switch WAN (102) and determining that the call is intended for the user (124). The system of FIG. 1 is also capable of receiving one or more RFID signals (126, 124, 122) from a user's RFID tag (119) and determining the location of the user (124) in dependence upon the RFID signals (126, 124, 122). The system of FIG. 1 is also capable of identifying location based routing preferences for a user maintained in a user account (120) stored in an RFID based telecommunications database (128) accessible through an enterprise server (101) through the WAN (102). The system of FIG. 1 is also capable of identifying a particular a telephony device (132) among a plurality of telephony devices (131, 132, 134, 136) in the networked environment in dependence of location based routing preferences for a user and forwarding the call to the telephony device in dependence upon the user's location and the user's location based routing preferences.

In some cases a more than one telephony device (131, 132) may be available to a user at a particular location within the networked environment. In such cases, the system of FIG. 1 is capable of receiving a call and determining that the call is intended for the user (124). The system of FIG. 1 is capable of receiving one or more RFID signals (126, 124, and 122) from an RFID tag (119) located with the user (124); determining the user's location in dependence upon the RFID signals (126, 124, and 122) and identifying a plurality of available telephony devices (131, 132) in dependence upon the user's location. The system of FIG. 1 is capable of identifying a device-based preference for the user, selecting one (132) of the plurality of available telephony devices (131) in dependence upon the device-based preferences and forwarding the call to the selected telephony device (132).

Users are often not static in a networked environment. That is, users often move around in a networked environment and often move from room to room. With the wide number of telephony devices and telecommunications methods available to a user, after receiving a call on a particular telephony device a user may move and in such cases the system of FIG. 1 is capable of rerouting the call to another telephony device in dependence upon an anticipated future location of the user. In such cases the system of FIG. 1 is capable of rerouting telecommunications to a user by receiving a plurality of RFID signals (126, 124, 122) from an RFID tag (119) located with the user (124); anticipating a user's future location in dependence upon the RFID signals (126, 124, 122); selecting a telephony device in dependence upon the anticipated future location; and rerouting an ongoing call to the selected telephony device. In such cases, the system of FIG. 1 advantageously provides seamless telecommunications to the user across the networked environment without requiring user intervention to reroute the ongoing call to another telephony device.

As discussed above, the communications gateway (108) of FIG. 1 is an OSGi enabled gateway. In the example of FIG. 1, in addition to being able to route telecommunications to the user (124), the communications gateway (108) is also capable of receiving device events from non-telephony devices within the networked environment and notifying the user of the receipt of such device events. Examples of such non-telephony devices capable of producing device events are coffee pots, ovens, dishwashers, computers, stereos, copy machines, and other devices that will occur to those of skill in the art. Such network-enabled devices are able to report their status to the communications gateway through events herein called device event. For example, a device event may be generated when the coffee pot has completed brewing a pot of coffee.

In the example of FIG. 1, a networked coffee pot (151) is coupled for data communications with the communications gateway (108). The system of FIG. 1 is capable of receiving a device event from the coffee pot and associating the device event with a user (124). The system of FIG. 1 is capable of receiving one or more RFID signals (126, 124, 122) from a user's RFID tag (119) and determining the user's location in dependence upon the RFID signals (126, 124, 122). The system of FIG. 1 is also capable of selecting a user notification appliance (838) in dependence upon the user's location and notifying the user (124) of the device event with the selected user notification appliance (838). The use of a coffee pot in the example of FIG. 1 is for explanation and not for limitation. The number and kind of networked devices, both telephony and non-telephony, capable of reporting a device event to a communications gateway is almost endless and all such devices are within the scope of the present invention.

The system of FIG. 1 is also capable of establishing RFID-based telecommunications routing for a user. In the system of FIG. 1 a user is empowered to log onto a communications application running on the communications gateway by use of a browser running on a laptop (136) in the user's office (129). The system of FIG. 1 establishes RFID based telecommunications routing by identifying the plurality of telephony devices (131, 132, 134, and 136) available to the user (124) in the networked environment and identifying the location of the telephony devices. The system of FIG. 1 is capable of receiving an identification of the telephony devices and an identification of their location from the user, from a network administrator, a landlord, or by downloading an identification of the telephony devices and an identification of their location from a network location supported by any person or process having such information. The system of FIG. 1 is capable of receiving from a user routing preferences and associating with the user the identified telephony devices available to a user, the locations of the plurality of devices available to the user; and the routing preferences in a user account (120) which in the example of FIG. 1 is stored in an RFID based telecommunications routing database.

As discussed above, RFID-based telecommunications routing is often implemented through the use of a computers. For further explanation, FIG. 2 sets forth a block diagram of automated computing machinery comprising a communications gateway (108) useful in routing telecommunications to a user according to embodiments of the present invention. The communications gateway (108) of FIG. 1, in some exemplary architectures, an OSGi compatible services gateway. While exemplary embodiments of routing telecommunications to a user are described in this specification using OSGi, many other applications and frameworks will work to implement routing telecommunications to a user according to the present invention, and are therefore also well within the scope of the present invention. Commercial implementations of OSGi, such as JES and SMF, are also useful in implementing methods of the present invention. "JES" stands for Java Embedded Server. JES is a commercial implementation of OSGi that provides a framework for development, deployment, and installation of applications and services to embedded devices. "SMF" stands for "Service Management Framework™" available from IBM®. SMF is a commercial implementation of OSGi for management of network delivered applications on services gateways.

Figure 2:
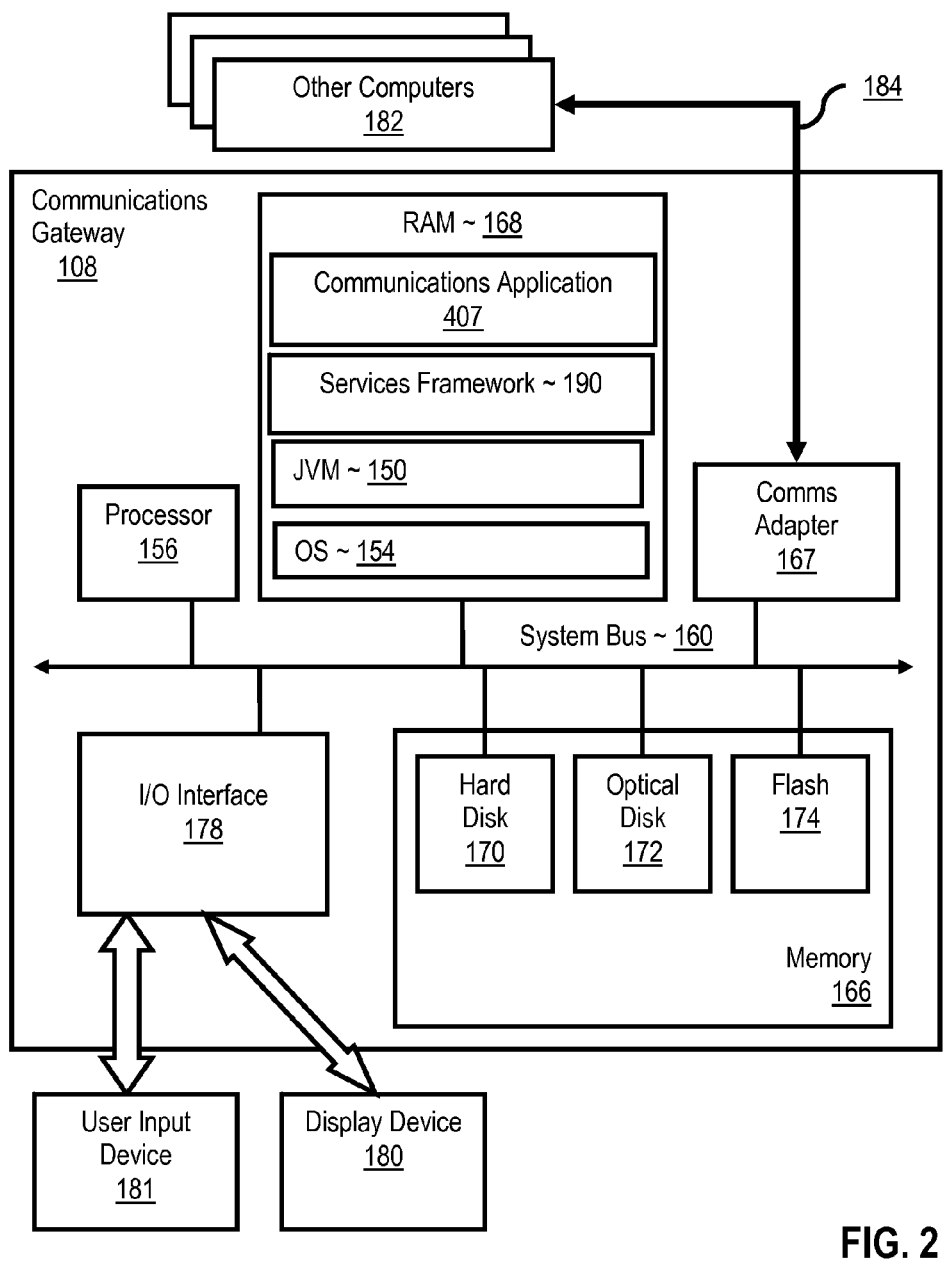
FIG. 2 sets forth a block diagram of automated computing machinery comprising a communications gateway useful in routing telecommunications to a user.

The communications gateway (108) of FIG. 2 includes at least one computer processor (156) or 'CPU' as well as random access memory (168) ("RAM"). Stored in RAM (168) is an operating system (154). Operating systems useful in computers according to embodiments of the present invention include Unix, Linux, Microsoft NT™, and many others as will occur to those of skill in the art. Operating system (154) in the example of FIG. 2 is shown in RAM (154), but many components of an operating system typically are stored in non-volatile memory (166) also.

Also stored in RAM (168) is a services framework (190). The services framework (190) of FIG. 1 is a hosting platform for running 'services'. Services are the main building blocks for creating applications in the OSGi. An OSGi services framework (190) is written in Java and therefore, typically runs on a Java Virtual Machine (JVM) (150).

The exemplary architecture of FIG. 2 includes a communications application (407). In some embodiments of the present invention, the communications application is OSGi compliant application software, and is therefore implemented as a service or a group of services packaged as a bundle installed on the services framework (190). In this specification, communications applications are often discussed in the context of OSGi. However, the discussion of OSGi is for explanation and not for limitation. In fact, communications applications according to various embodiments of the present invention can be implemented in any programming language, C, C++, COBOL, FORTRAN, BASIC, and so on, as will occur to those of skill in the art, and communications applications developed in languages other than Java are installed directly upon an operating system or operating environment rather than a JVM.

The communications gateway (108) of FIG. 2 includes non-volatile computer memory (166) coupled through a system bus (160) to a processor (156) and to other components of the gateway. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary communications gateway (108) of FIG. 2 includes a communications adapter (167) for implementing connections for data communications (184), including connections through networks, to other computers (182), including RFID readers, telephony devices, network-enabled devices, non-telephony devices, notification appliances, servers, clients, and others as will occur to those of skill in the art. Communications adapters implement the hardware level of connections for data communications through which local devices and remote devices or servers send data communications directly to one another and through networks.

The exemplary communications gateway (108) of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

Figure 3:
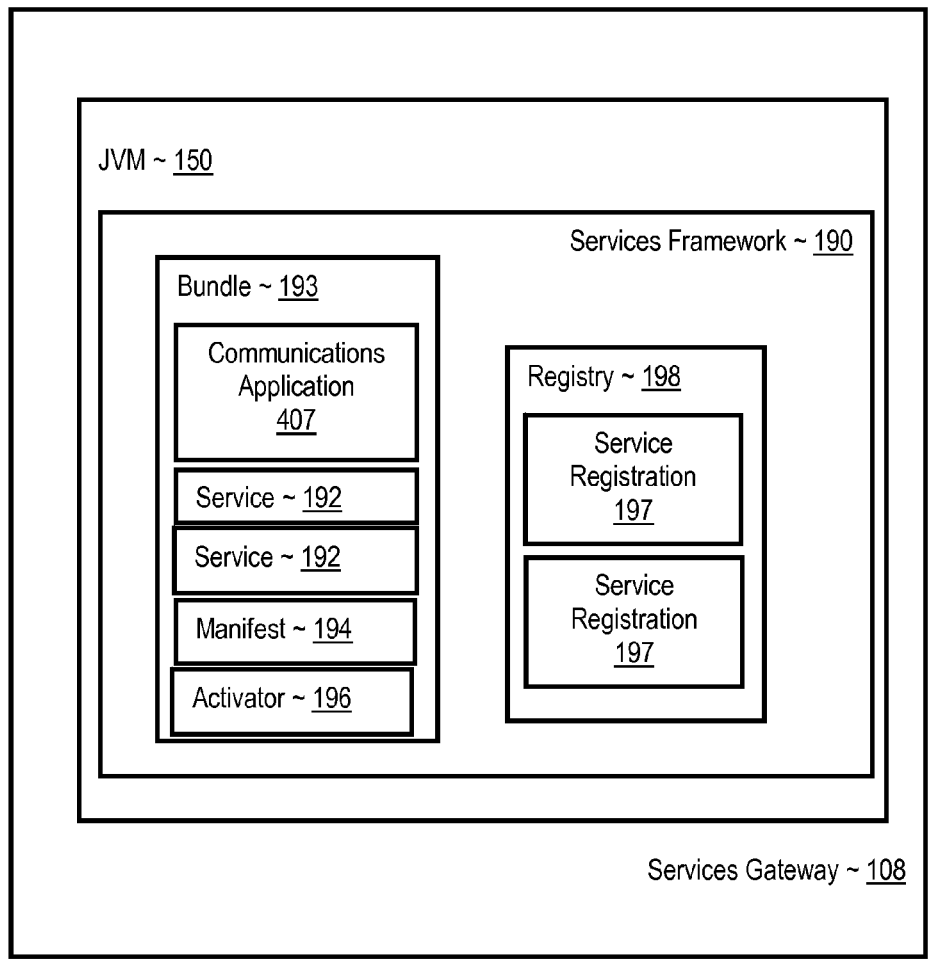
FIG. 3 sets forth an exemplary OSGi-compliant services gateway useful in routing telecommunications to a user.

As discussed above, communications gateways useful in telecommunications routing are often implemented as OSGi-compliant services gateways. For further explanation, FIG. 3 sets forth an exemplary OSGi-compliant services gateway (108) useful in routing telecommunications to a user in accordance with embodiments of the present invention. While exemplary embodiments of methods for routing telecommunications to a user are described in this specification using OSGi, many other applications and frameworks other than OSGi will work to implement methods of administering devices according to the present invention and are therefore well within the scope of the present invention. The services gateway (108) of FIG. 3 includes a service framework (190). An OSGi service framework (190) is written in Java and therefore, typically runs on a Java Virtual Machine (JVM) (150). In OSGi, the service framework (190) of FIG. 3 is a hosting platform for running 'services' (192). The term 'service' or 'services' in this disclosure, depending on context, generally refers to OSGi-compliant services.

Services (192) are the main building blocks for creating applications according to the OSGi. A service (192) is a group of Java classes and interfaces that implement a certain feature. The OSGi specification provides a number of standard services. For example, OSGi provides a standard HTTP service that creates a web server that can respond to requests from HTTP clients.

OSGi also provides a set of standard services called the Device Access Specification. The Device Access Specification ("DAS") provides services to identify a device connected to the services gateway, search for a driver for that device, and install the driver for the device.

Services (192) in OSGi are packaged in 'bundles' (193) with other files, images, and resources that the services (192) need for execution. A bundle (193) is a Java archive or 'JAR' file including one or more service implementations (192), an activator class (196), and a manifest file (194). An activator class (196) is a Java class that the service framework (190) uses to start and stop a bundle. A manifest file (194) is a standard text file that describes the contents of the bundle (193).

In the exemplary architecture of FIG. 3 includes a communications application (407). In many embodiments of the present invention, the communications application is an OSGi service that carries out telecommunications routing according to embodiments of the present invention. The communications application (108) of FIG. 3 is packaged within a bundle (193) and installed on the services framework (190).

The services framework (190) in OSGi also includes a service registry (198). The service registry (198) includes a service registration (197) including the service's name and an instance of a class that implements the service for each bundle (193) installed on the framework (190) and registered with the service registry (198). A bundle (193) may request services that are not included in the bundle (193) but are registered on the framework service registry (198). To find a service, a bundle (193) performs a query on the framework's service registry (198).

Routing Telecommunications to a User in Dependence Upon Location

As mentioned above, RFID-based telecommunications routing according to embodiments of the present invention advantageously routes telecommunications to users in dependence upon user preferences. Such user preferences include both location based routing preferences, as well as device-based routing preferences. The present section of this disclosure is directed toward routing telecommunications to a user in dependence upon location and, in some embodiments, using location-based routing preferences. For further explanation, FIG. 4 sets forth a flow chart illustrating an exemplary method for routing telecommunications to a user. The method of FIG. 4 includes receiving (402) a call (404). In typical embodiments of the present invention, receiving (402) a call (404) includes receiving in a communications gateway a call transmitted through either a packet switched wide area network, the public switched telephone network or any other telecommunications-enabled network that will occur to those of skill in the art. The method of FIG. 4 includes determining (406) that the call (404) is intended for the user (408). In typical embodiments, determining (406) that the call (404) is intended for the user (408) is carried out a communications application bundle executing on the communications gateway. In some such embodiments, the bundle includes one or more services implementing an automated call hander and speech to text conversion. For further explanation, FIG. 5 sets forth a flow chart illustrating an exemplary method for determining that the call (404) is intended for the user (408). The method of FIG. 5 includes prompting (502) the caller for the name of the user and receiving (504) from the caller as speech (506) the name of the user. Prompting (502) the caller for the name of the user may be carried out by playing a prerecorded prompt to the user requesting that the user speak the name of the intended recipient of the call.

Figure 5:
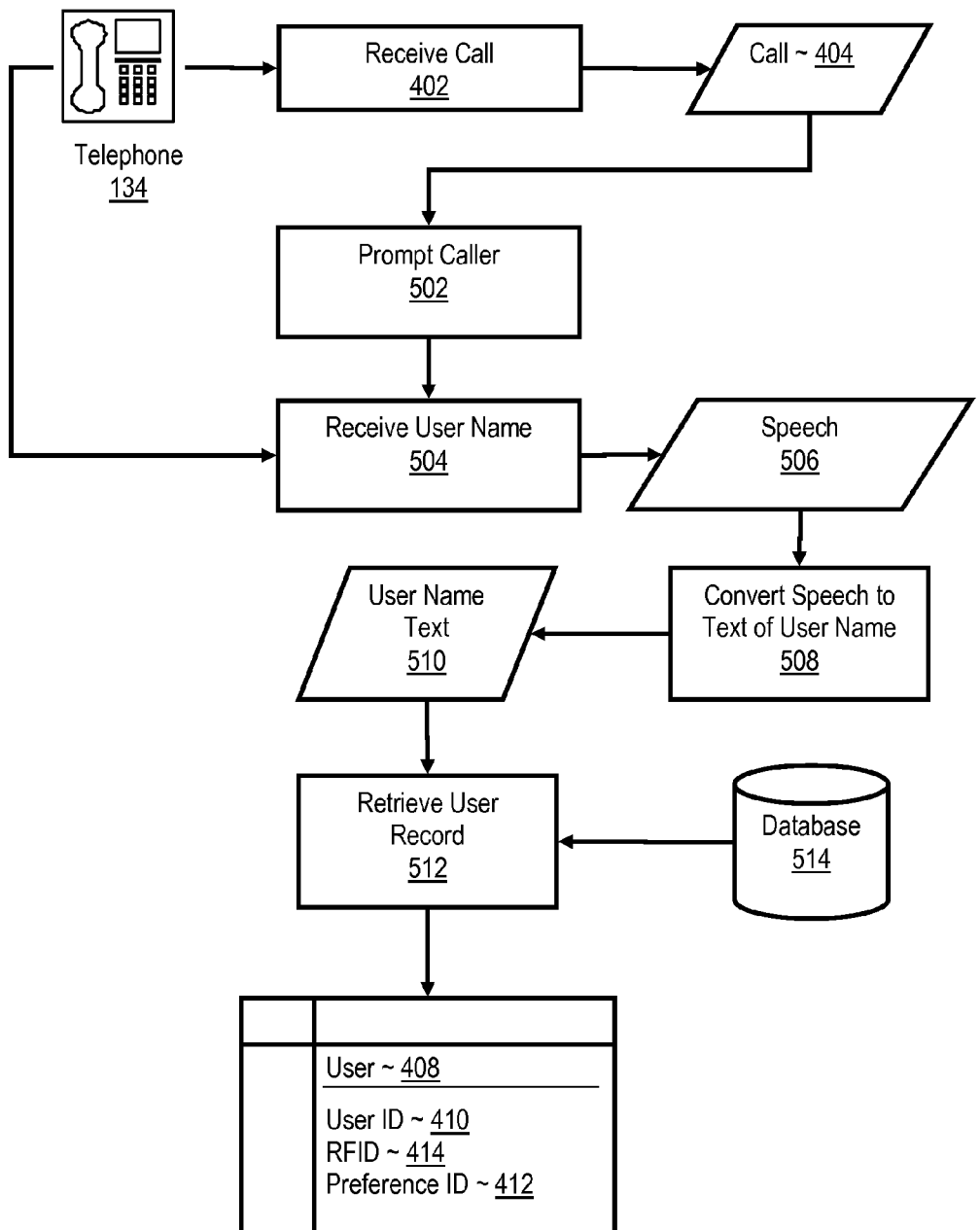
FIG. 5 sets forth a flow chart illustrating an exemplary method for determining that the call is intended for the user.

The method of FIG. 5 also includes converting (508) the speech (506) to text (510). Off the shelf speech-to-text conversion and speech recognition software is commercially available and is available for use by communications applications of the present invention for use in determining that a call is intended for a particular user. Examples of such a commercially available products are ViaVoice™ available from IBM® and the Java Speech API available from Sun Microsystems, Inc.

The method of FIG. 5 also includes retrieving (512) a user record (408) in dependence upon the text (510). In the method of FIG. 5, retrieving (512) a user record (408) in dependence upon the text (510) includes searching a database (514) containing user records on the text of the user's name. If the search returns a match, the method of FIG. 5 includes returning to the executing communications application a user record for the identified user.

The exemplary user record (408) of FIG. 5 includes a user ID (410) uniquely identifying the user. The exemplary user record (408) of FIG. 5 also includes an identification of the user's RFID tag (414) uniquely identifying the RFID tag. The exemplary user record (408) of FIG. 5 includes a preference ID (412) identifying user preferences such as location-based routing preferences and device-based routing preferences discussed in more detail below.

Continuing again with reference to FIG. 4: The method of FIG. 4 includes receiving (415) an RFID signal (416) from a user's RFID tag (414). As discussed above, RFID tags are often available as either active RFID tags or passive RFID tags. The RFID signal in the example of FIG. 4 therefore can be either an RFID signal from an active RFID tag located with or attached to the user or an RFID signal from a passive RFID tag located with or attached to the user.

Figure 4:
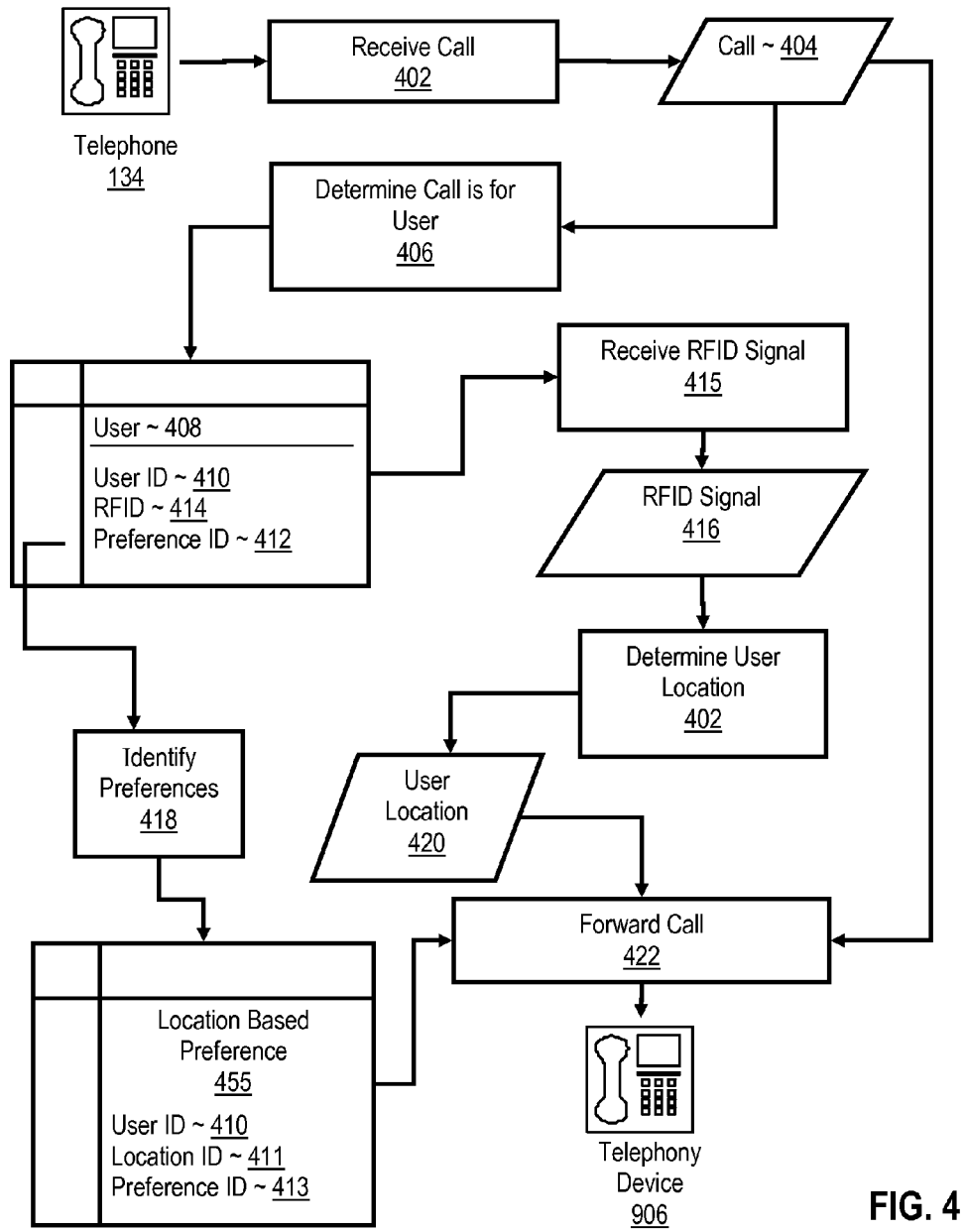
FIG. 4 sets forth a flow chart illustrating an exemplary method for routing telecommunications to a user.

The method of FIG. 4 also includes determining (418) the location (420) of the user in dependence upon the RFID signal (414). As discussed in more detail below with reference to FIGS. 6, 7, and 8, determining the location of the user in dependence upon RFID signals can be carried out by near field sensing of the user's tag at fixed locations within the networked environment or through the user of trilateration. The exemplary descriptions of near field sensing and trilateration are for explanation and not for limitation. In fact, there are many ways of determining the location of the user in dependence upon RFID signals that will occur to those of skill in the art and all such ways are will within the scope of the present invention.

The method of FIG. 4 also includes identifying (418) location-based routing preferences (455) for the user and forwarding (422) the call (404) to a telephony device (134) in dependence upon the user's location (420) and the user's location based routing preferences (455). Location-based routing preferences are preferences for a user describing a preferred routing of telecommunications in dependence upon the user's location. For example, an exemplary location-based routing preference may demonstrate that despite having more telephony devices available, a user will accept calls on telephony devices in the living room and the bedroom only. Therefore, when the user's location is within a range of locations predetermined to be closer to the living room, calls are routed to the living room. When the user's location is within a range of locations predetermined to be closer to the bedroom room, calls are routed to the bedroom.

In the example of FIG. 4, location-based routing preferences are implemented as a location-based preference record (455). The exemplary location-based preference record (455) of FIG. 4 includes a user ID (410) uniquely identifying the user. The exemplary location-based preference record (455) also includes a location ID (411) identifying the user location for which the location based routing preference is to be implemented. The location ID (411) may be a latitude and longitude, a room designation, a physical address, or a range of locations represented in any manner as will occur to those of skill in the art. The location-based preference record (455) includes a preference ID (413) uniquely identifying the routing preference associated with the location ID.

As discussed above, determining the location of a user through the use of RFID can be carried out in a number of ways. On way of determining the location of the user includes near field sensing of the RFID tag at fixed reader locations in the networked domain and applying a rule set to the identified fixed reader locations to approximate the location of the user. For further explanation therefore, FIG. 6 sets forth an exemplary method for determining the location of the user in dependence upon RFID signals. The method of FIG. 6 includes receiving (610) a plurality of RFID signals (414) from a user's RFID tag at a plurality of RFID reader locations (612) and storing (614) the reader ID and date and time that the signal was received in a data structure representing an indication of the user's location.

Figure 6:
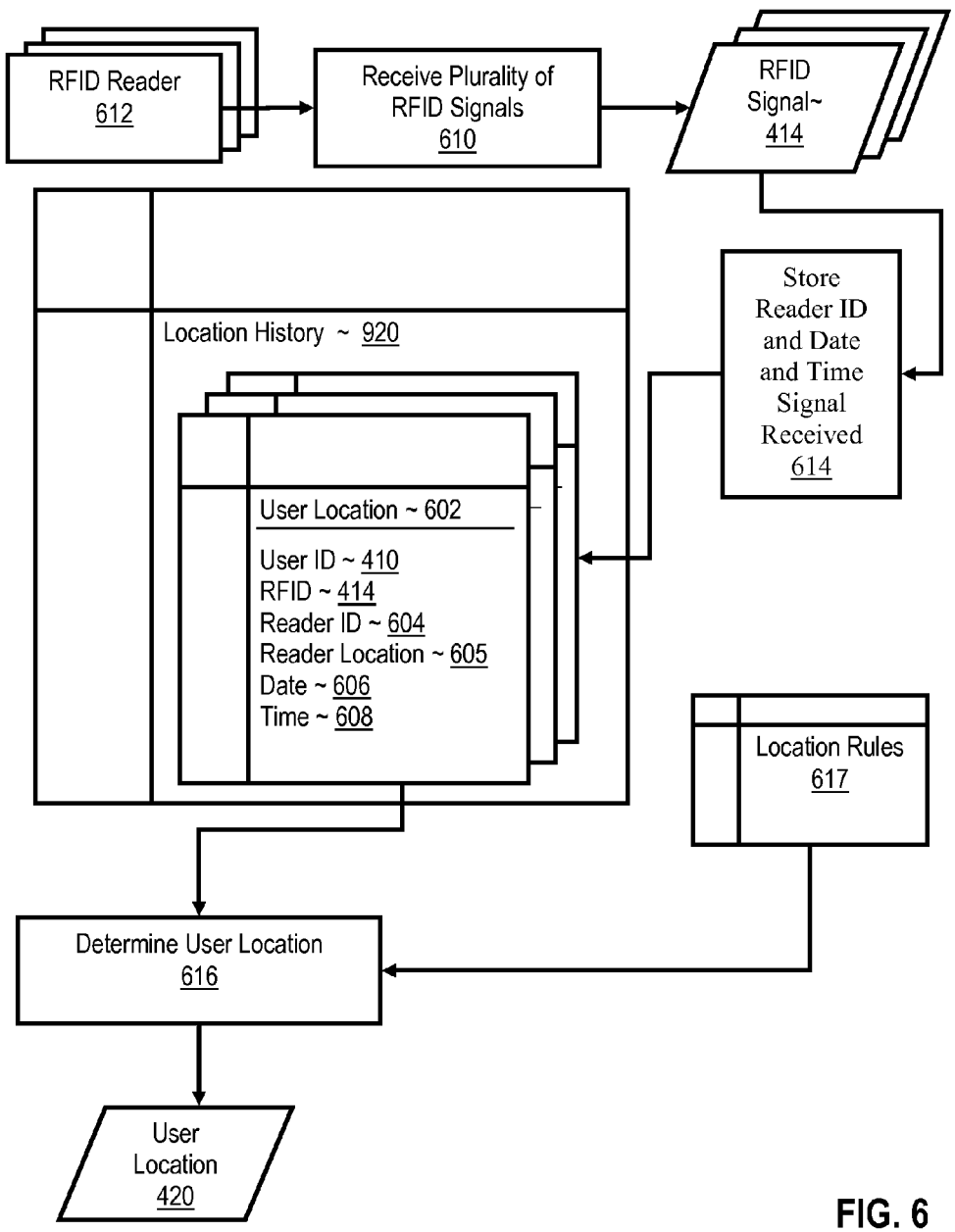
FIG. 6 sets forth an exemplary method for determining the location of the user in dependence upon RFID signals.

In the example of FIG. 6, a user location record (602) represents an indication of the user' location and each of which is created in response to receiving an RFID signal from the user's RFID tag at a fixed location within the networked domain and stored in a user location history (920) which is a collection of user location records. The exemplary user location record (602) of FIG. 6 includes a user ID field (410) uniquely identifying the user. The user exemplary user location record (602) includes an RFID tag ID (414) identifying the user's RFID tag sending the RFID signal to the RFID reader located at a fixed location within the networked environment. The exemplary user location record (602) also includes a reader ID field (604) uniquely identifying the RFID reader receiving the RFID signal. The exemplary user location record (602) also includes a reader location (605) identifying the location of the RFID reader in the networked domain. The exemplary user location record also includes the date (606) and time (608) that the RFID reader received the signal.

The method of FIG. 6 also includes determining (616) the location (420) of the user in dependence upon the RFID reader locations (605) and a rule (617). Applying a rule to a plurality of fixed reader locations, each of which approximates a user's location provides increased accuracy to the approximate user location provided by sensing the user's RFID tag a fixed location within the networked environment.

For further explanation consider the following use case. RFID readers are fixed at various locations in a user's office. An RFID reader is fixed near the entrance of a copy room, an RFID reader is also fixed at various locations within the copy room. If the RFID reader at the entrance of the copy room receives an RFID signal from the user's RFID tag and the RFID readers within the copy room receive an RFID signals soon thereafter, it is determined that the user is within the copy room. A rule useful in describing this use case is:

For a user:
  If copy room entrance reader true; and
    If interior reader true within a predetermined time period;
    then
      User is in the copy room;
    If interior reader not true within the predetermined time period;
    then
      User is not in the copy room.

Near field sensing of the user at fixed points in the networked domain advantageously provides a rough estimate of the user's location within the networked environment. Applying rules to the near field sensing of a user at plurality of fixed locations provides increased accuracy in approximating the user's location.

As just discussed above, near field sensing of a user at fixed points in the networked environment is a mechanism for locating the user without attempting to specifically locate the RFID tag itself. The user is located only by determining that the user's RFID tag is within the range of one or more RFID readers. A user may be more accurately located through the use of a method called trilateration. For further explanation, FIGS. 7 and 8 set forth line drawings that when taken together illustrate a method for determining the location of the user in dependence upon received RFID signals that uses trilateration. The method of FIGS. 7 and 8 includes receiving a plurality of RFID signals from the user's RFID tag (612 on FIG. 7) at a plurality of RFID reader locations (612*a*, 612*b*, and 612*c* on FIG. 7) and determining for each RFID reader a distance (A, B, and C on FIG. 7) between each the RFID reader and the user's RFID tag.

Figure 7:
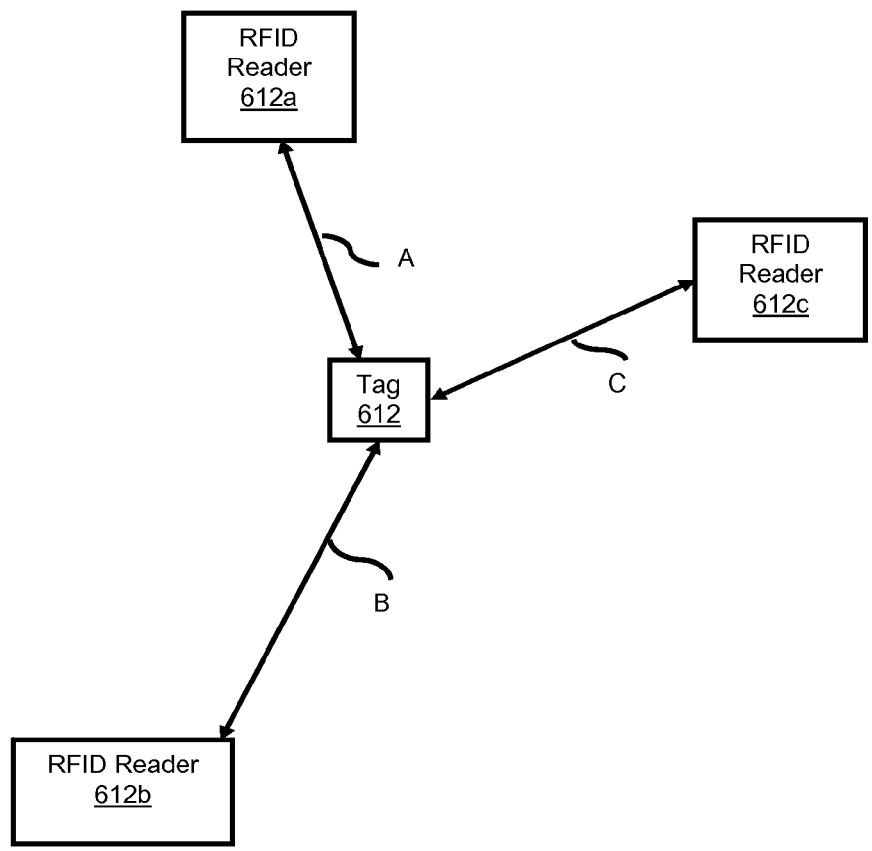
FIGS. 7 and 8 include determining for each RFID reader an area of possible locations of the RFID tag in dependence upon the distance between the RFID readers and the RFID tag.
Figure 8:
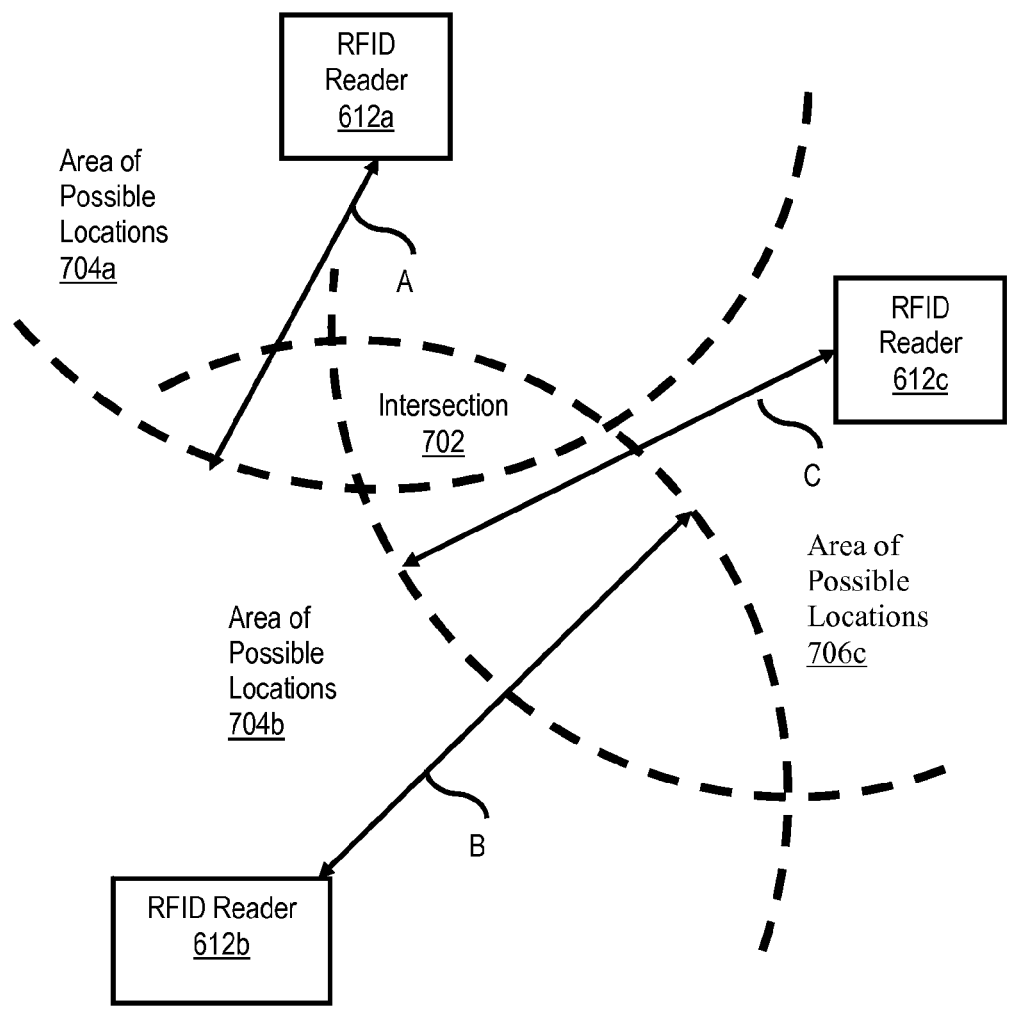

The method of FIGS. 7 and 8 also includes determining for each RFID reader (612*a*, 612*b*, and 612*c* on FIG. 8) an area (704*a*, 704*b*, and 704*c* on FIG. 8) of possible locations of the RFID tag in dependence upon the distance (A, B, and C on FIGS. 7 and 8) between the RFID readers (612*a*, 612*b*, and 612*c* on FIGS. 7 and 8) and the RFID tag (612). In the method of FIGS. 7 and 8, the area (704*a*, 704*b*, and 704*c* on FIG. 8) of possible locations of the RFID tag is represented by an area defined by a radius equal to the distance (A, B, and C on FIG. 7) between each RFID reader and the RFID tag. The method of FIGS. 7 and 8 also includes determining the intersection (702 on FIG. 8) of the areas (704*a*, 704*b*, and 704*c* on FIG. 8) of possible locations of the RFID tag. The intersection of the areas (704*a*, 704*b*, and 704*c* on FIG. 8) of possible locations is the approximate location of the RFID tag and therefore the user. As will occur those of skill in the art, increasing the number of RFID readers available for use in the method of FIG. 7 and FIG. 8 often decreases the area of intersection.

As shown above, the method of FIGS. 7 and 8 includes determining the distance (A, B, and C, on FIGS. 7 and 8) between the RFID readers (612a, 612b, and 612c on FIGS. 7 and 8) and the users RFID tag (612 on FIG. 7). One way of determining the distance (A, B, and 3, on FIGS. 7 and 8) between the RFID readers (612a, 612b, and 612c on FIGS. 7 and 8) and the users RFID tag (612 on FIG. 7) is carried out by sending from each RFID reader an RFID signal. If another RFID signal is returned by an RFID tag, the method includes determining the period of time between sending the first RFID signal and receiving the response signal from the RFID tag. This period of time is then divided by two and then divided by the speed of the RFID signal to determine the distance between the reader and the tag.

Because radio signals travel at the speed of light, accurately measuring the send and response time of signal travel between a reader and tag may be cumbersome. Another method of determining the distance (A, B, and C, on FIGS. 7 and 8) between the RFID readers (612a, 612b, and 612c on FIGS. 7 and 8) and the users RFID tag (612 on FIG. 7) that is less cumbersome includes using varying signal strengths to vary the range of the RFID reader. In such cases, an RFID reader sends an RFID signal, and if a tag responds, the reader sends another signal with less strength. The reader repeatedly sends signals of diminishing strength until the tag no longer responds. The strength of each signal has a predetermined range of effectiveness. Therefore, by systematically reducing the range of effectiveness of the reader, the distance (A, B, and C, on FIGS. 7 and 8) between the RFID readers (612a, 612b, and 612c on FIGS. 7 and 8) and the users RFID tag (612 on FIG. 7) can be approximated as being between the range of effectiveness of the signal for having the last response from a tag and the range of effectiveness for the signal for which there was no response from the tag. Systematically varying the signal strength to approximate the distance between the reader and tag provide a less cumbersome method of determining the distance (A, B, and C, on FIGS. 7 and 8) between the RFID readers (612a, 612b, and 612c on FIGS. 7 and 8) and the users RFID tag (612 on FIG. 7).

Figure 9:
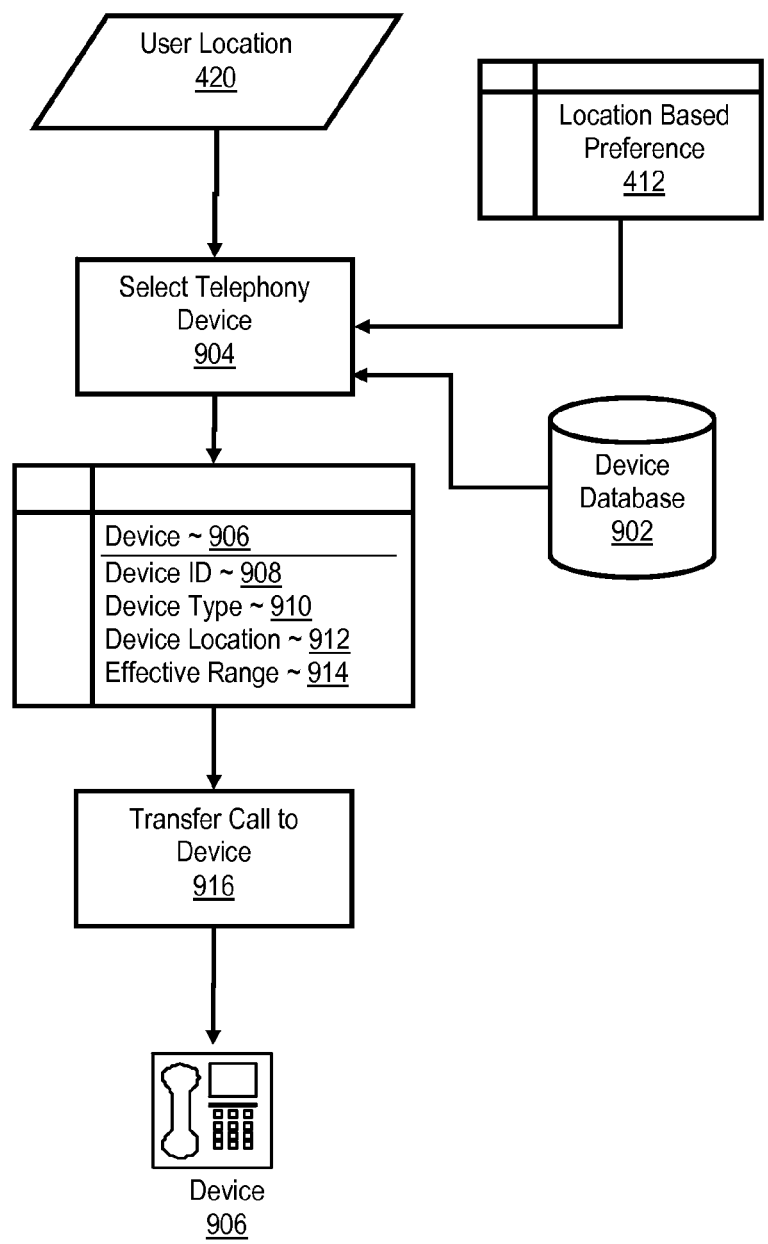
FIG. 9 sets forth an exemplary method for forwarding the call to a telephony device in dependence upon the user's location and location-based user preferences.

As discussed above, once a user is located, telecommunications routing according to some embodiments of the present invention advantageously forward calls to telephony devices in dependence upon the user's location. For further explanation, FIG. 9 sets forth an exemplary method for forwarding the call to a telephony device in dependence upon the user's location and location-based user preferences. The method of FIG. 9 includes selecting (904) a telephony device (906) in dependence upon the user's location (420) and location based routing preferences (455). In the method of FIG. 9, selecting (904) a telephony device (906) in dependence upon the user's location (420) and location based routing preferences (455) is carried out by selecting a device record (906) from a device data base that represents the telephony device.

The exemplary telephony device record (906) of FIG. 9 includes a device ID (908) uniquely representing the telephony device. The exemplary device record (906) of FIG. 9 includes a device type (910) identifying the type of telephony device. Examples of telephony device type include telephone, laptop, PDA, speakerphone, wireless telephone, wireline telephone, cellular telephone, and so on as will occur to those of skill in the art. The exemplary telephony device record (906) of FIG. 9 includes a device location (962) identifying the location of the device. A location of the device may be represented as a latitude and longitude, a room designation, a physical address, or any other representation of location that will occur to those of skill in the art. The exemplary telephony device record (906) of FIG. 9 also includes an effective range (914). An effective range describes the physical area for which the device is effective. For example, a speaker phone may have a range of effectiveness of 10 square feet, while a wireline phone may have an effective range of only two square feet.

The method of FIG. 9 includes transferring (916) the call to the selected telephony device (906). Transferring (916) the call to the selected telephony device (906) is typically carried out by calling API functions provided in a telephony API. Examples of telephony APIs include Java Telephony API available from Sun Microsystems, Inc., CallPath API available from IBM®, and others that will occur to those of skill in the art.

Figure 10:
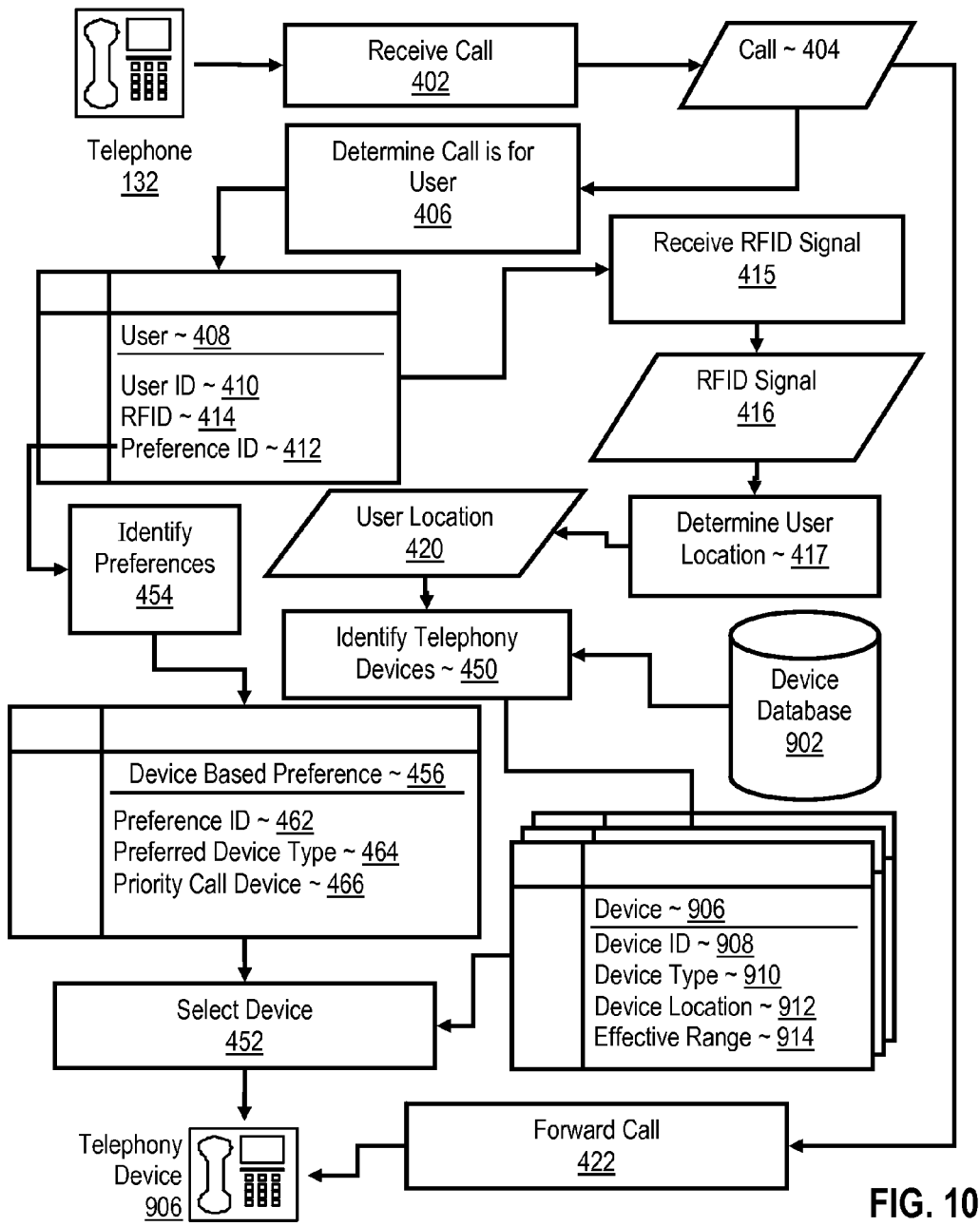
FIG. 10 sets forth another exemplary method for routing telecommunications to a user.

Routing Telecommunications to a User in Dependence Upon Device-Based Routing Preferences FIG. 10 sets forth another exemplary method for routing telecommunications to a user. The method of FIG. 10 includes receiving (402) a call (404) and determining (406) that the call (404) is intended for the user (408). As discussed above with reference to FIG. 5, one way of determining that the call is intended for the user includes speech-to-text conversion. In some such embodiments, determining (406) that the call (404) is intended for the user (408) includes prompting the caller for the name of the user, receiving from the caller as speech the name of the user, converting the speech to a text, and retrieving a user record in dependence upon the text.

The method of FIG. 10 also includes receiving (415) an RFID signal (414) from an RFID tag (414) located with the user (408) and determining (417) the user's location (420) in dependence upon the RFID signal (416). As discussed above, RFID tags are often available as either active RFID tags or passive RFID tags. The RFID signal in the example of FIG. 10 therefore can be either an RFID signal from an active RFID tag located with or attached to the user or an RFID signal from a passive RFID tag located with or attached to the user. Also discussed in more detail above with reference to FIGS. 6, 7, and 8, determining the location of the user in dependence upon RFID signals can be carried out by near field sensing of the user's tag at fixed locations within the networked environment or through the user of trilateration. The exemplary descriptions of near field sensing and trilateration are for explanation and not for limitation. In fact, there are many ways of determining the location of the user in dependence upon RFID signals that will occur to those of skill in the art and all such ways are will within the scope of the present invention.

The method of FIG. 10 includes identifying (450) a plurality of available telephony devices (906) in dependence upon the user's location (420). In the method of FIG. 10, identifying (450) a plurality of available telephony devices (906) in dependence upon the user's location (420) includes selecting a telephony device record (906) from a device data base (902) in dependence upon the user location. Selecting a telephony device record (906) from a device data base (902) in dependence upon the user location is typically carried out by searching the device database (902) for telephony device record whose location most closely matches the user location.

It is not uncommon for more than one telephony device to be available to a user in a particular location. That is, a user at a particular location in the networked environment may often have more than one telephony device available. The method of FIG. 10 therefore includes identifying (454) a device-based preference (456) for the user (408) and selecting (452) one of the plurality of available telephony devices (906) in dependence upon the device-based preference (456). Device-based preferences are preferences useful in selecting one of a plurality of available devices. Device-based preferences may be provided by a user. Examples of device based preferences include preferences for wireless telephony devices over wireline devices, preferences for telephony devices with speakers over devices without speakers, a preference of devices that are wall mounted as opposed to those that are not wall mounted, and so on as will occur to those of skill in the art.

In the example of FIG. 10, the device-based preferences are implemented in data as a device based preference record (456). The exemplary device based preference record (456) of FIG. 10 includes a preference ID field (462) that uniquely identifies the preference. The exemplary device based preference record (456) of FIG. 10 also includes a preferred device type field (464) that includes preferences for telephony devices in dependence of device type. Examples of device types include wireless devices, wireline devices, wall mounted devices, mobile devices, devices with speakers, and so on as will occur to those of skill in the art. The exemplary device based preference record (456) of FIG. 10 includes a priority call device (466) field that includes a device type or device identification of a device for priority calls. For example, a priority call device may include a user's mobile phone and in such cases only high priory calls are routed to the mobile phone.

Figure 11:
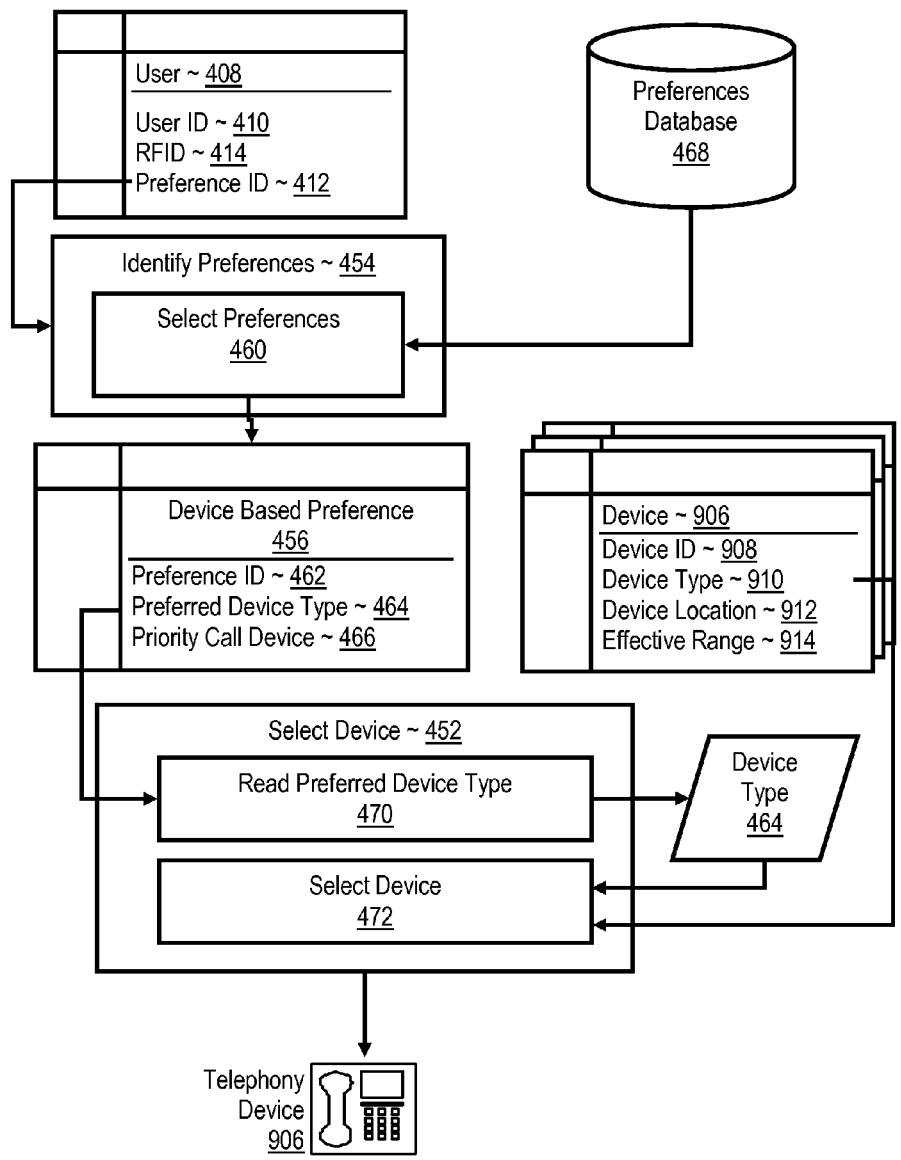
FIG. 11 sets forth an exemplary method for identifying device-based preferences for the user and selecting one of the plurality of available telephony devices in dependence upon the device-based preferences.

In the method of FIG. 10, selecting (452) one of the plurality of available telephony devices (906) in dependence upon the device-based preference (456) typically includes searching the telephony device records previously selected in dependence upon the user's location on the device type field for a matching record. For further explanation, FIG. 11 sets forth an exemplary method for identifying (454) device-based preferences (456) for the user (408) and selecting (452) one of the plurality of available telephony devices (906) in dependence upon the device-based preferences (456). In the method of FIG. 11, identifying (454) device-based preferences (456) for the user (408) is carried out by selecting (460) a device-based preferences record (456) from a preferences database (468). In the method of FIG. 11, selecting (452) one of the plurality of available telephony devices (906) in dependence upon the device-based preferences (456) is carried out by reading (470) from a device-based preferences record (456) an indication of a preferred communication device type (464) and selecting (472) a device (906) of the preferred communication device type (464).

Continuing again with reference to FIG. 10: The method of FIG. 10 includes forwarding (422) the call to the selected telephony device (906). Forwarding the call to the selected telephony device (906) is typically carried out by calling API functions provided in a telephony API. Examples of telephony APIs include Java Telephony API available from Sun Microsystems, Inc., CallPath API available from IBM®, and others that will occur to those of skill in the art.

Not all calls for a user are of equal importance. Situations may arise when a user may desire that calls be prioritized and that telecommunications routing be performed to rout the call to an appropriate telephony device in dependence upon the priority of the call. For further explanation, FIG. 12 sets forth an exemplary flow chart illustrating an exemplary method for selecting one of the plurality of available telephony devices (906) in dependence upon the device-based preferences (456)

Figure 12:
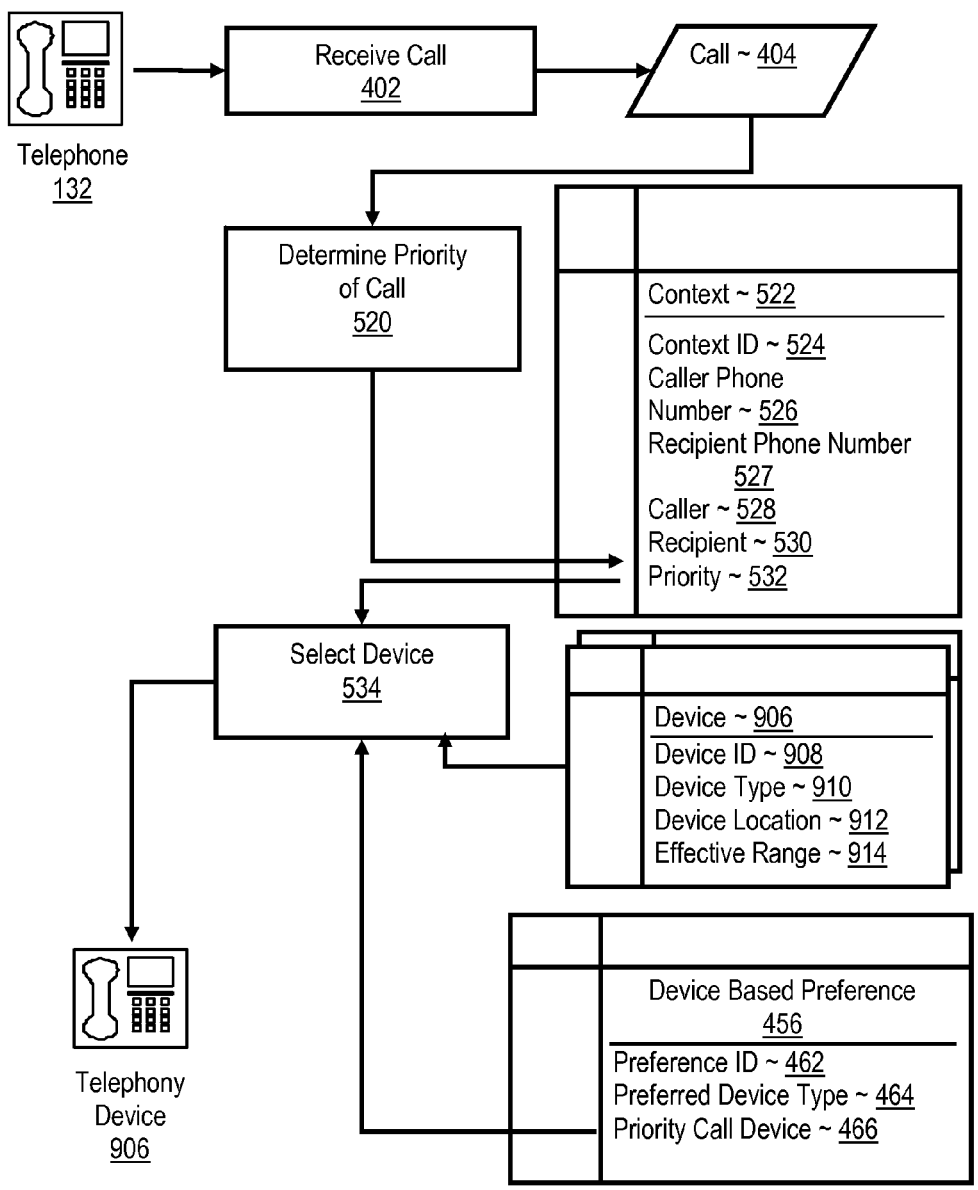
FIG. 12 sets forth an exemplary flow chart illustrating an exemplary method for selecting one of the plurality of available telephony devices in dependence upon the device-based preferences.

The method of FIG. 12 includes determining (520) a priority (532) of the call (404). One way of determining the priority of the call includes prompting the user for an indication of the call, receiving as speech the priority of the call, and converting the priority from speech to text.

In the method of FIG. 12, the priority of the call is included in a call context data structure (522). A call context (522) is typically a data structure including information about a particular call used for telecommunications routing. The exemplary call context (522) of FIG. 12 includes a context ID (524) uniquely identifying the call. The exemplary call context (522) of FIG. 12 also includes a phone number (526) field including the phone number of the phone from which the call was place. The exemplary call context (522) of FIG. 12 includes a recipient phone number field (527) including the receiving phone number of the call. The exemplary call context (522) of FIG. 12 includes a caller field (528) including an identification of the caller. The exemplary call context (522) of FIG. 12 includes a recipient field including an identification of the user. The exemplary call context (522) of FIG. 12 includes a priority designation (532). Priorities may be designated as Boolean indications of high priority or not high priority, as values representing degrees of priorities, or any other priority designation that will occur to those of skill in the art.

The method of FIG. 12 also includes selecting (534) one of a plurality of telephony devices (906) in dependence upon the priority (532) of the call (404). Selecting (534) one of a plurality of telephony devices (906) in dependence upon the priority (532) of the call (404) is carried out by reading from a device-based preferences record a priority call device (466) and selecting a device (906) in dependence upon the priority call device. In some embodiments, the priority call device identifies a particular device to receive all high priority calls. In other embodiments, the priority call device identifies a device type for receiving high priority calls and selecting a device (906) in dependence upon the priority call device includes selecting a device of the priority call device type.

Rerouting Ongoing Telecommunications to a User

Users are often not static in a networked environment. That is, users often move around in a networked environment and often move from room to room. With the wide number of telephony devices available to a user, after receiving a call on a particular telephony device a user may move and in such cases it is advantageous to reroute the call to another telephony device in dependence upon an anticipated future location of the user. For further explanation, FIG. 13 sets forth another exemplary method for rerouting telecommunications to a user. The method of FIG. 13 includes receiving (620) a plurality of RFID signals (416) from an RFID tag (414) located with the user (408) and anticipating (622) a user's future location (624) in dependence upon the RFID signals (416).

Anticipating (622) a user's future location (624) in dependence upon the RFID signals (416) can be carried out using a combination of the methods for locating a user described above. For further explanation FIG. 14 sets forth a flow chart illustrating an exemplary method for anticipating a user's future location (624) that includes determining (722) a first user location (724). As discussed in more detail above with reference to FIGS. 6, 7, and 8, determining a first user location of the user in dependence upon RFID signals can be carried out by near field sensing of the user's tag at fixed locations within the networked environment or through the user of trilateration. The exemplary descriptions of near field sensing and trilateration are for explanation and not for limitation. In fact, there are many ways of determining a first location of the user in dependence upon RFID signals that will occur to those of skill in the art and all such ways are will within the scope of the present invention.

Figure 14:
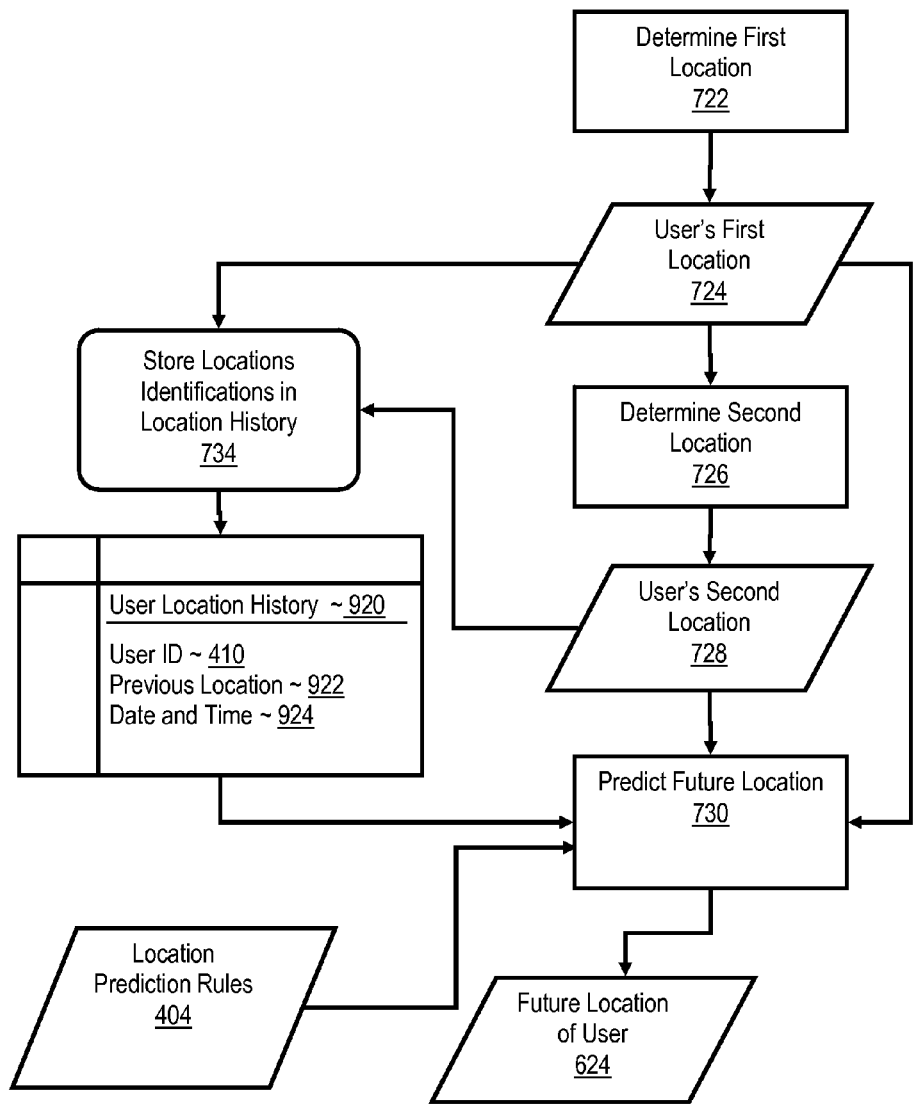
FIG. 14 sets forth a flow chart illustrating an exemplary method for anticipating a user's future location that includes determining a first user location.

The method of FIG. 14 also includes determining (726) a second user location (728). As discussed in more detail above with reference to FIGS. 6, 7, and 8, determining the location of the user in dependence upon RFID signals can be carried out by near field sensing of the user's tag at fixed locations within the networked environment or through the user of trilateration. The exemplary descriptions of near field sensing and trilateration are for explanation and not for limitation. In fact, there are many ways of determining the location of the user in dependence upon RFID signals that will occur to those of skill in the art and all such ways are will within the scope of the present invention.

The method of FIG. 14 also includes predicting (730) a user' future location (624) in dependence upon the first user location (724) and the second user location (728). One way of predicting (720) a user' future location (624) in dependence upon the first user location (724) and the second user location (728) includes calculating a line of motion through the first location and the second location and selecting a future user location on the line of motion.

As will occur to those of skill in the art using only two previous user locations to predict a user's future location is a crude estimation of the user's future location. The method of FIG. 14 therefore also includes storing (734) locations identifications in a user location history (920). A user location history is a data structure containing identifications of previous locations of a user indexed by the date and time (924) the user was at the previous location. The exemplary user location history of FIG. 14 includes a user ID (410) uniquely identifying the user location. The exemplary user location history (920) of FIG. 14 also includes a description or identification of the previous location (922). The description or identification of the previous location of the user may be a latitude and longitude, a room designation, a physical address or any other description or identification of a previous location that will occur to those of skill in the art.

The method of FIG. 14 also includes predicting (720) a user' future location (624) in dependence the user location history and location prediction rules (404). Location prediction rules are rules useful in predicting a users future location in dependence upon more than two location stored in the user location history. Location prediction rules often predict a user's future location in dependence upon factors such as speed of movement, change of direction, and the geographic layout of the networked environments as well as others that will occur to those of skill in the art.

For further explanation of the use of location prediction rules, consider the following exemplary rule for an office with a north facing door to a living room.

If user previous location is office and
    If four locations indicate that the user is moving north toward the door;
        Then predict user is leaving office and entering living room.

In implementing this exemplary rule, a communications gateway has determined that the user's previous location is in the office. A line through four locations in a user location history indicates the user is traveling north through the door to the living room. A communications gateway implementing this exemplary location prediction rule predicts that the user is leaving the office and entering the living room. The communications gateway implementing this rule therefore predicts that the user's future location is in the living room. Location prediction rules advantageously provide a vehicle for increased accuracy in predicting a user's future location for rerouting ongoing telecommunications.

Figure 13:
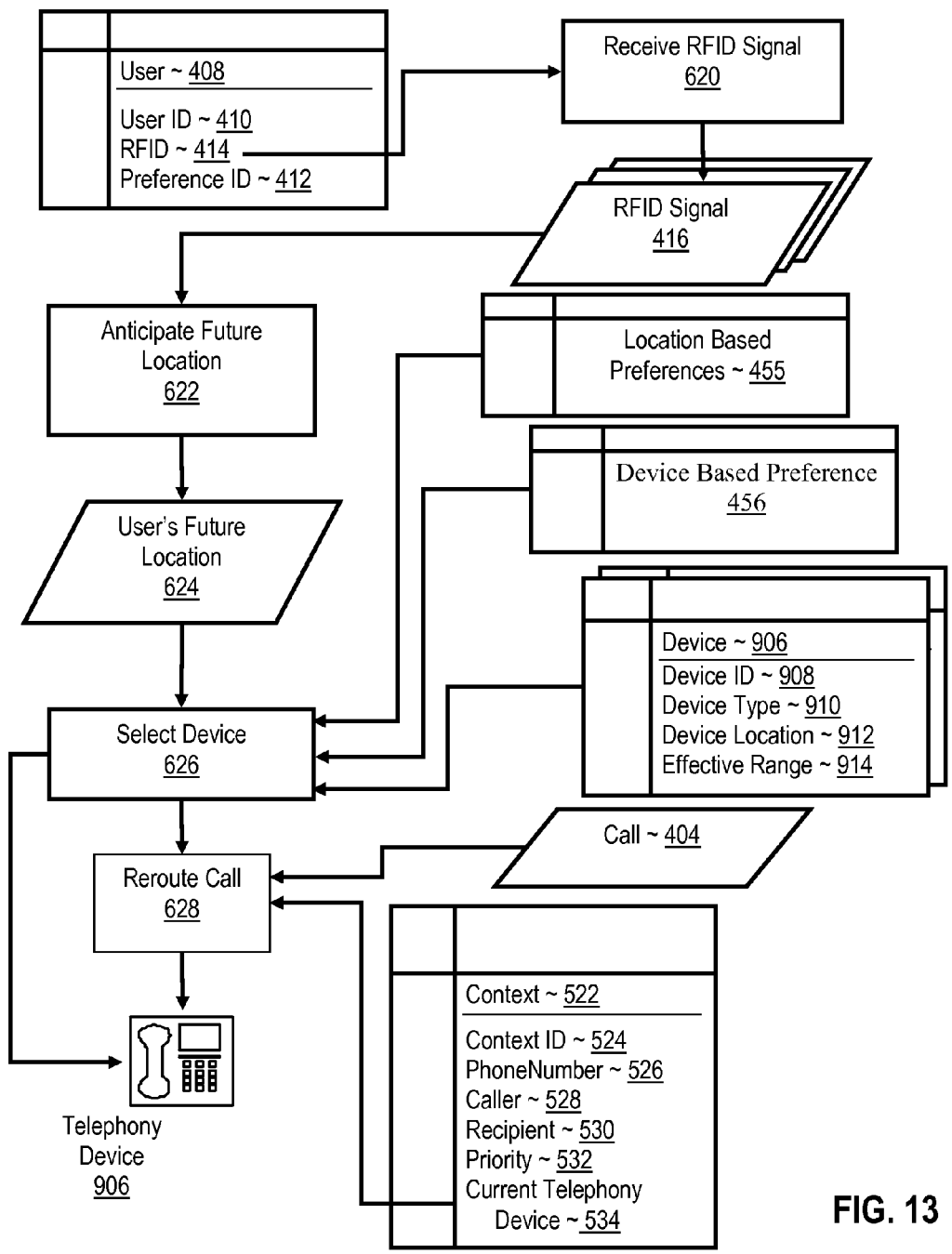
FIG. 13 sets forth another exemplary method for rerouting telecommunications to a user.

Continuing again with reference to FIG. 13: The method of FIG. 13 also includes selecting (626) a telephony device (906) in dependence upon the anticipated future location (624). In the method of FIG. 13, selecting (626) a telephony device (906) in dependence upon the anticipated future location (622) also includes identifying device-based routing preferences (456) for the user and selecting (626) a telephony device (906) in dependence device based preferences. As discussed above, often more than one telephony device may be available to a user at the anticipated future location. Device-based preferences are preferences useful in selecting one of a plurality of available devices. Example of device based preferences include preferences for wireless telephony devices over wireline devices, preferences for telephony devices with speakers over devices without speakers, a preference of devices that are wall mounted as opposed to those that are not wall mounted, and so on as will occur to those of skill in the art. In the method of FIG. 13, identifying device-based preferences for the user is carried out by selecting a device-based preferences record from a preferences database. In the method of FIG. 13, selecting (626) a telephony device (906) in dependence device based preferences is carried out by selecting (626) a device (906) record from a device database having a device type matching the preferred device type indicated in the device based preference record.

In the method of FIG. 13, selecting (626) a telephony device (906) in dependence upon the anticipated future location (622) includes identifying location based routing preferences (455) for the user. As discussed above, location-based routing preferences are preferences for a user describing a preferred routing of telecommunications in dependence upon the user's location. For example, an exemplary location-based routing preference may describe that despite having more telephony devices available, a user will accept calls on telephony devices in living room and the bedroom only. Therefore, when the user's location is within a range of locations predetermined to be closer to the living room, calls are routed to the living room. When the user's location is within a range of locations predetermined to be closer to the bedroom room, calls are routed to the bedroom.

The method of FIG. 13 also includes rerouting (628) an ongoing call (404) to the selected telephony device (906). In method of FIG. 13, rerouting (628) an ongoing call (404) to the selected telephony device (906) includes reading from a context (522) for the ongoing call the current telephony device (534) and transferring the call to the selected telephony device (906). Transferring the call to the selected telephony device is typically carried out by calling API functions provided in a telephony API available for use by a communications gateway. Examples of telephony APIs include Java Telephony API available from Sun Microsystems, Inc., CallPath API available from IBM®, and others that will occur to those of skill in the art.

Notifying Users of Device Events in a Networked Environment

As discussed above, the communications gateways operating in accordance with the present invention are able to detect device events in addition to routing telecommunications to a user. In such embodiments, not only are telephony devices coupled for data communications with a communications gateway, but other network-enabled devices, either telephony or noon-telephony, such as coffee pots, ovens, dishwashers, computers, stereos, copy machines, and other devices are also coupled for data communications with the communications gateway. Such network-enabled devices are able to report their status to the communications gateway through events herein called device event. When such an event is received in the communications gateway it would be advantageous to notify the user of the device event.

Figure 15:
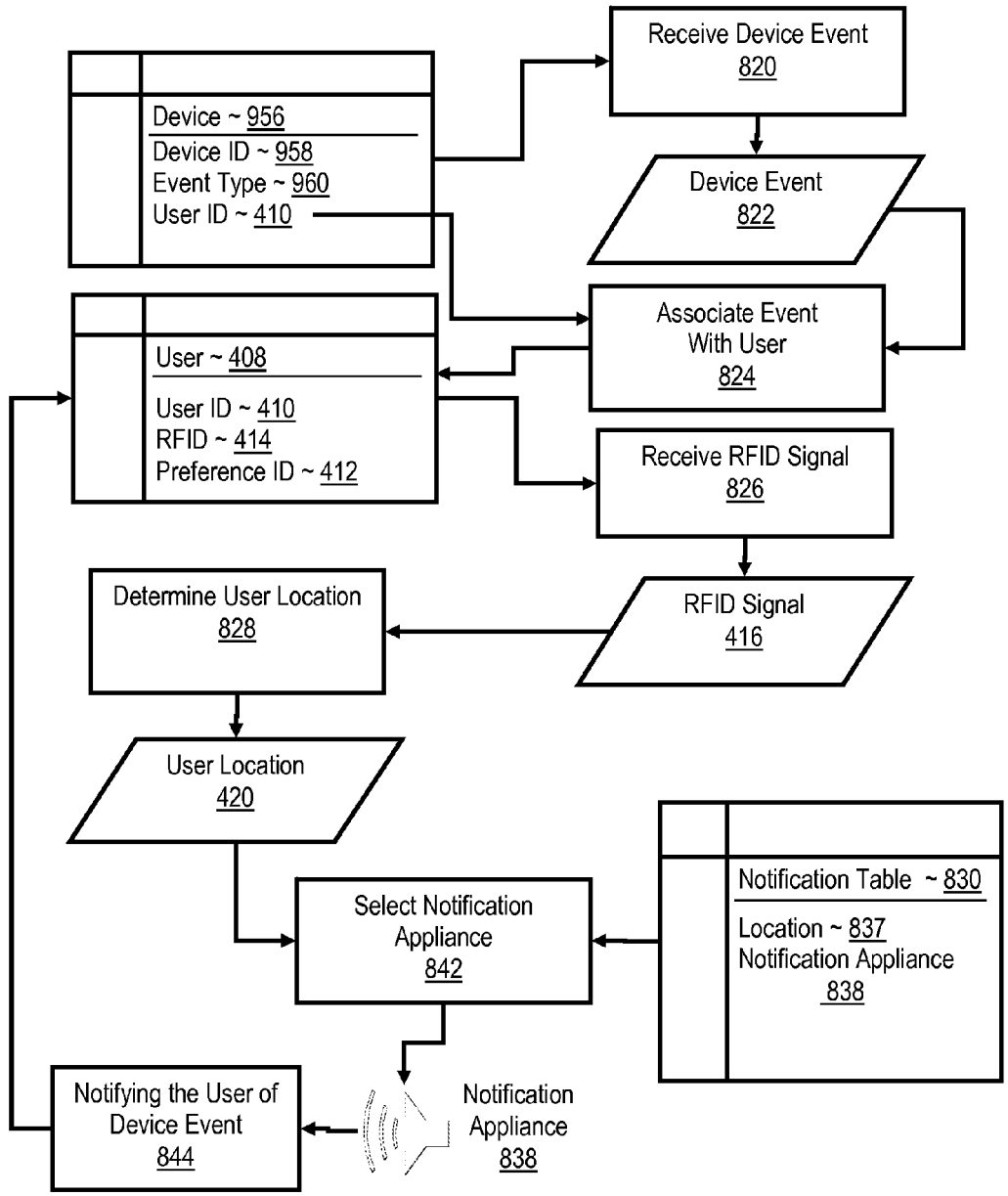
FIG. 15 sets forth a flow chart illustrating an exemplary method for notifying a user of a device event that includes receiving a device event.

For further explanation, FIG. 15 sets forth a flow chart illustrating an exemplary method for notifying a user of a device event that includes receiving (820) a device event (822). In some embodiments, receiving a device event is carried out by receiving a device event from a device that reports its status on its own motion. For example, a coffee pot may be configured to send a device event notifying the communications gateway that the pot has finished brewing without requiring the gateway to poll the coffee pot. Alternatively, receiving (820) a device event (822) includes polling the device periodically for the status of the device. In such examples, receiving a device event typically includes calling member methods in a device class representing the device such as for example, getStatus( ) to get the status of the device.

The method of FIG. 15 also includes associating (824) the device event (822) with a user (408). In the method of FIG. 15, associating (824) the device event (822) with a user (408) is carried out by reading a user ID (410) from a device record (956) for the device. In the example of FIG. 15, the device itself has an owner and therefore, only the user identified in the device class for the device is notified of the device event.

The device generating the device event is, in the method of FIG. 15, represented in data with a device record (956) representing any device capable of reporting its status. Such devices can be either telephony devices, or non-telephony devices. The exemplary device record (956) of FIG. 15 includes a device ID (958) uniquely identifying the device. The exemplary device record (956) of FIG. 15 includes a event type (960) identifying the type of event generated by the device. The exemplary device record (956) of FIG. 15 also includes a user ID (410) identifying that in the example of FIG. 15 the device has an owner.

The method of FIG. 15 also includes receiving (826) an RFID signal (416) from a user's RFID tag (414) and determining (828) the user's location (420) in dependence upon the RFID signal (416). As discussed above, RFID tags are often available as either active RFID tags or passive RFID tags. The RFID signal in the example of FIG. 15 therefore can be either an RFID signal from an active RFID tag located with or attached to the user or an RFID signal from a passive RFID tag located with or attached to the user. Also discussed in more detail above with reference to FIGS. 6, 7, and 8, determining the location of the user in dependence upon RFID signals can be carried out by near field sensing of the user's tag at fixed locations within the networked environment or through the user of trilateration. The exemplary descriptions of near field sensing and trilateration are for explanation and not for limitation. In fact, there are many ways of determining the location of the user in dependence upon RFID signals that will occur to those of skill in the art and all such ways are will within the scope of the present invention.

The method of FIG. 15 also includes selecting (842) a user notification appliance (838) in dependence upon the user's location (420). A user notification appliance (838) is any networked device capable of data communications with a communications gateway or other hardware or software implementing aspects of the method of FIG. 15 and gaining the attention of a user. A user notification appliance may be as sophisticated as a computer that is programmed to send a user a standardized email to notify the user of the device event, or as lightweight as a single speaker device capable of playing earcons, or sound icons, notifying the user of the device event. There are many types of user notification appliances available and all such user notification appliances are well within the scope of the present invention.

In the method of FIG. 15, selecting (842) a user notification appliance (838) in dependence upon the user's location (420) includes retrieving from a notification table (830) a notification appliance ID (838) identifying a notification appliance for use at the user's current location. The exemplary notification table (830) of FIG. 15 includes notification appliances (838) indexed by their location (837). Selecting (842) a user notification appliance (838) in dependence upon the user's location (420) typically includes searching the notification table (830) on the location field (837) for a notification appliance (838) whose location is nearest the user.

The method of FIG. 15 also includes notifying (844) the user (408) of the device event (820) with the selected user notification appliance (838). Notifying the user of the device event with the selected user notification appliance may be carried out in some embodiments by calling member methods in a device class for the notification appliance such as, for example, PlayEarCon( ).

Figure 16:
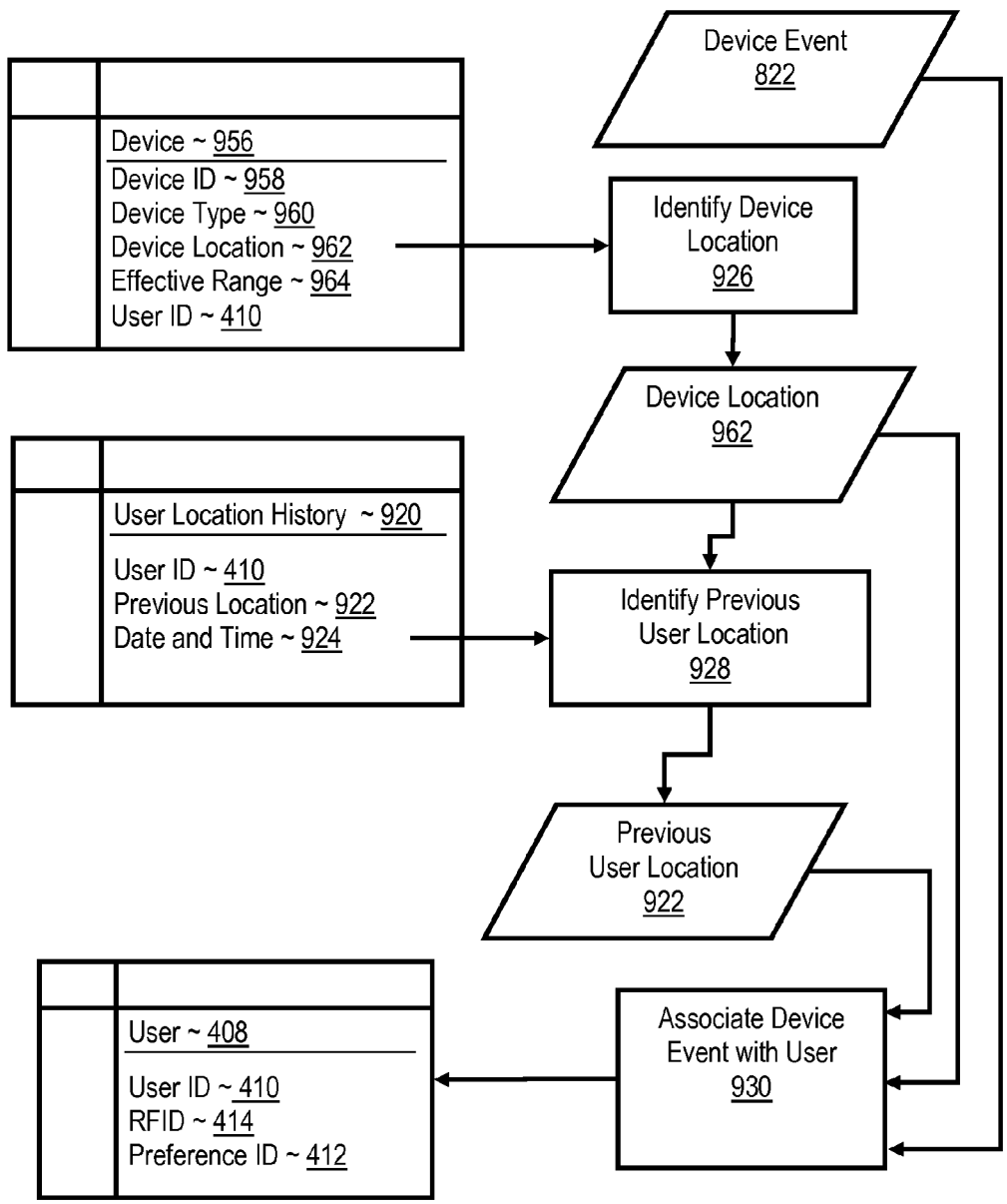
FIG. 16 sets forth an exemplary method for associating with a user a device event generated by a device without an owner.

In the example of FIG. 15, the device itself had an owner and therefore associating the device event with a user to be notified was carried out by reading the user from the device class for the device. In many cases, however, devices are shared and therefore do not have a single owner. For further explanation, FIG. 16 sets forth an exemplary method for associating with a user a device event generated by a device without an owner. The method of FIG. 16 includes identifying (824) the location (962) of the device (956). In the method of FIG. 16 identifying (824) the location (962) of the device (956) includes reading a description of the location (962) of the device from a field (962) in a device record representing the device (956).

The method of FIG. 16 includes identifying (928) a previous location (922) of the user (408). In the method of FIG. 16 identifying (928) a previous location (922) of the user (408) includes reading a description of a previous location of a user from a user's location history (920).

The method of FIG. 16 includes associating (930) the device event (822) with a user (408) in dependence upon the location (962) of the device (956) and the previous location of the user (922). In the method of FIG. 16, associating (930) the device event (822) with a user (408) in dependence upon the location (962) of the device (956) and the previous location of the user (922) is typically carried out by identifying a user whose previous location most closely matches the location of the device. The method of FIG. 16, therefore identifies one or more users whose previous location most closely match the location of the device and therefore are most likely the users who should be notified of the device event.

Figure 17:
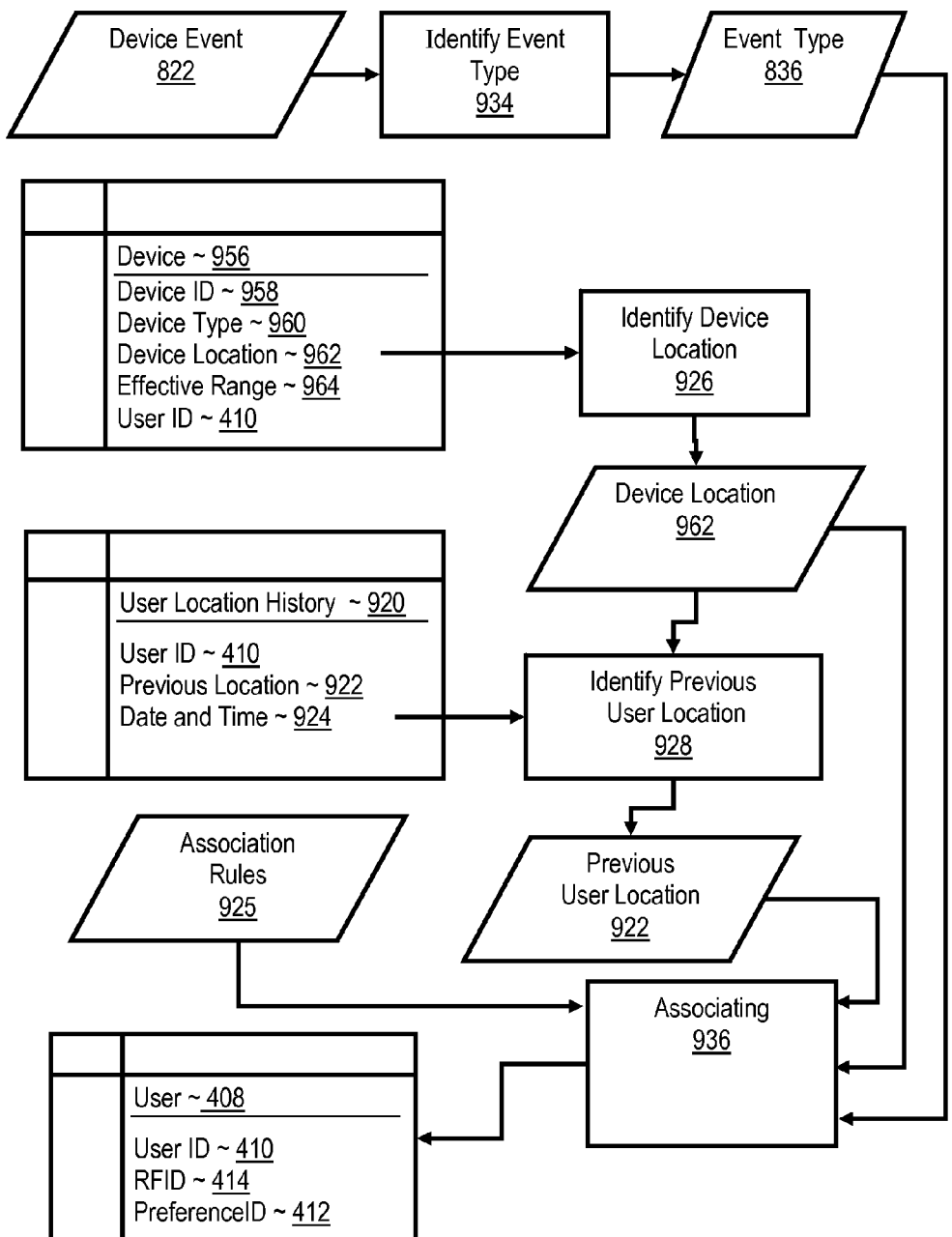
FIG. 17 sets forth another exemplary method for associating the device event with a user.

The method of FIG. 16 associates users whose previous location most closely match the location of the device. However, associating users with device event may advantageously use device types to more accurately identify the user to be notified of the device event. For example, a device event that a coffee pot is finished brewing may be more accurately associated with a user who was located near the coffee pot five minutes ago, than with a user near the pot five hours ago. For further explanation therefore, FIG. 17 sets forth another exemplary method for associating the device event with a user. The method of FIG. 17 includes identifying (934) an event type (836) of the device event (822) and identifying (926) the location (962) of the device (956). In the method of FIG. 17, identifying (926) the location (962) of the device (956) includes reading a description of the location (962) of the device from a field (962) in a device record representing the device (956).

The method of FIG. 17 also includes identifying (928) a previous location (922) of the user (408). In the method of FIG. 17, identifying (928) a previous location (922) of the user (408) includes reading a description of a previous location of a user from a user's location history (920).

The method of FIG. 17 includes associating (936) the device event (822) with the user (408) in dependence upon the event type (836) of the device event (822), the location (962) of the device (956), and the user's previous location (922). In the method of FIG. 17, associating (936) the device event (822) with the user (408) in dependence upon the event type (836) of the device event (822), the location (962) of the device (956), and the user's previous location (922) includes associating (936) the device event (822) with the user (408) in dependence upon the event type (836) of the device event (822), the location (962) of the device (956), and the user's previous location (922) with association rules (925). Association rules provide a vehicle for associating a user with a device event. For further explanation consider the following association rule:

If event type is 'preheating complete'; and
Device location is 'kitchen'; and
User location history indicates user was in the kitchen in the past 20 minutes; then
Associate device event with the user.

A communications application implementing the rule above determines that the device event type represents preheating is complete for a networked oven. The communications application determines that the oven is in fact in the kitchen. A communications application implanting this association rule then determines whether a user has been in the kitchen in the last 20 minutes. If a user has been in the kitchen in the last twenty minutes then, the communications application implementing this association rule associates the device event with the user. The use of association rules advantageously provide a vehicle for increased accuracy in associating users with device events and therefore, increased accuracy in notifying only appropriate users of those device events.

Establishing User Accounts for RFID-Based Telecommunications Routing

As discussed above, user records, user routing preferences, and other data useful in implementing methods of routing and rerouting telecommunications to a user may be stored in computer memory within the networked environment and directly accessible to a communications gateway or such information may be available through an enterprise server coupled for data communications with the communications gateway through a WAN. For further explanation, FIG. 18 sets forth an exemplary method for establishing RFID-based telecommunications routing for a user (408). The method of FIG. 18 includes identifying (350) a plurality of telephony devices (906) available to a user (408). As discussed above, in this specification a telephony device is any device useful in facilitating telecommunications among users. Telephony device include computers, digital communications equipment, analog communications equipment or any other communications device that will occur to those of skill in the art.

Figure 18:
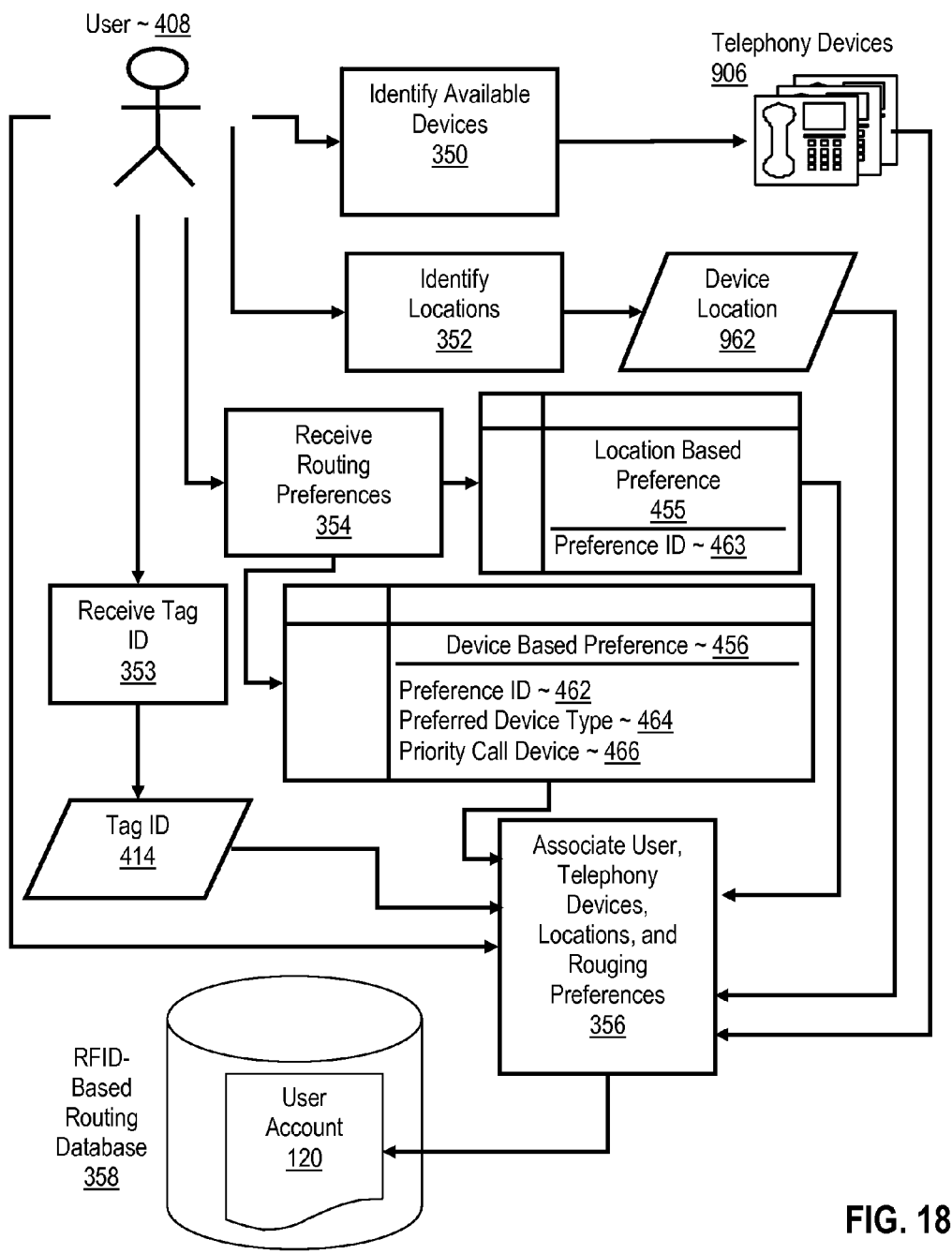
FIG. 18 sets forth an exemplary method for establishing RFID-based telecommunications routing for a user.

In the method of FIG. 18, identifying (350) a plurality of telephony devices (906) available to a user (408) is carried out by receiving a telephony device identification from the user. Receiving a telephony device identification from a user may be carried out by receiving in a communication application the device identification from a user directly or by receiving the device identification at a service provider. One way of directly receiving a telephony device identification from the user is carried out by providing through a communications application instruction screens accessible by use of a browser that are designed to facilitate receiving through the instruction screens an identification of one or more telephony devices in the networked environment. An identification of a telephony device may include a serial number of the telephony device, a make and model of the telephony device or any other identification of a telephony device that will occur to those of skill in the art.

Receiving a telephony device identification from a user may alternatively be carried out by service provider. In such an embodiment, a service provider establishing an RFID-based telecommunications routing account for the user may receive from a user an identification of one or more telephony devices in the networked environment and provide such identification to the communications application through an enterprise server coupled for data communications with a communications gateway in the user's networked environment.

The method of FIG. 18 includes identifying (352) the location (962) of the plurality of telephony devices (906) available to the user (408). In the method of FIG. 18, identifying (352) the location (962) of the plurality of telephony devices (906) available to the user (408) is carried out by receiving a telephony device location identification from the user. Receiving a telephony device location identification from the user may be carried out by receiving the location directly from a user in a communication application or by receiving the location using a service provider. In some embodiments, a user is empowered to directly provide to a communications application identifications of the locations of telephony devices in the networked environment. One way of receiving such identifications of the locations of telephony devices in the networked environment directly from the user is carried out by providing through a communications application instruction screens accessible by use of a browser that are designed to facilitate receiving the locations of one or more telephony devices. An identification of a location of a telephony device may include a room designation, a latitude and longitude, a physical address, or any other identification or description of a location of a telephony device that will occur to those of skill in the art.

Receiving a telephony device location identification from the user may also be carried out through a service provider. In some such embodiments, a service provider establishing an RFID-based telecommunications routing account for the user may receive from a user an identification of the location of a telephony device and provide such identification of the location of the telephony device to the communications application through an enterprise server coupled for data communications with a communications gateway in the user's networked environment.

The method of FIG. 18 includes receiving (354) from a user (408) routing preferences (456, 455). In the method of FIG. 18, receiving (354) from a user (408) routing preferences includes receiving from the user location based routing preferences. As discussed above, location-based routing preferences are preferences for a user describing a preferred routing of telecommunications in dependence upon particular user locations within the networked environment. For example, an exemplary location-based routing preference may indicate that that despite having more telephony devices available, a user will accept calls on telephony devices in living room and the bedroom only. Therefore, when the user's location is within a range of locations predetermined to be closer to the living room, calls are routed to the living room. When the user's location is within a range of locations predetermined to be closer to the bedroom room, calls are routed to the bedroom.

In the method of FIG. 18, receiving (354) from a user (408) routing preferences (456, 455) may be carried out by receiving the routing preferences in a communications application from a user directly or receiving the routing preferences through a service provider. In some embodiments, a user is empowered to directly provide to a communications application routing preferences for use in the networked environment. One way of receiving such location based routing preferences directly from the user is carried out by providing through a communications application instruction screens accessible by use of a browser that are designed to facilitate receiving from the user location-based routing preferences for the networked environment. In some other embodiments, a service provider establishing an RFID-based telecommunications routing account for the user may receive from a user location-based routing preferences and provide those routing preferences to a communications application through an enterprise server coupled for data communications with a communications gateway in the user's networked environment.

In the method of FIG. 18, receiving (354) from a user (408) routing preferences also includes receiving from the user device-based routing preferences. As discussed above, device-based preferences are preferences useful in selecting one of a plurality of available devices. Example of device based preferences include preferences for wireless telephony devices over wireline devices, preferences for telephony devices with speakers over devices without speakers, a preference of devices that are wall mounted as opposed to those that are not wall mounted, and so on as will occur to those of skill in the art.

In the method of FIG. 18, receiving (354) from a user (408) device-based routing preferences (456, 455) may be carried out by receiving the device-based routing preferences directly from a user or by receiving the device-based routing preferences through a service provider. In some embodiments, a user is empowered to directly provide to a communications application device-based routing preferences for use in the networked environment. One way of receiving such device-based routing preferences directly from the user is carried out by providing through a communications application instruction screens accessible by use of a browser that are designed to facilitate receiving from the user such device-based routing preferences for the networked environment. In some other embodiments, a service provider establishing an RFID-based telecommunications routing account for the user may receive from a user device-based routing preferences and provide those routing preferences to a communications application through an enterprise server coupled for data communications with a communications gateway in the user's networked environment.

The method of FIG. 18 also includes receiving (353) an RFID tag identification (414) for a user. As discussed above, the RFID tag is located with the user and therefore is typically used to uniquely locate the user. In the method of FIG. 18, receiving (353) an RFID tag identification (414) for a user may be carried out by receiving the identification directly in a communications application from a user or by receiving the identification through a service provider. In some embodiments, a user is empowered to directly provide to a communications application an identification of the RFID tag. One way of receiving such an identification directly from the user is carried out by providing through a communications application instruction screens accessible by use of a browser that are designed to facilitate receiving from the RFID tag identification. In some other embodiments, a service provider establishing an RFID-based telecommunications routing account for the user may receive from a user an identification of the user's RFID tag and provide the tag identification as part of the information available to a communications application through an enterprise server coupled for data communications with a communications gateway in the user's networked environment.

The method of FIG. 18 also includes associating (356) with the user (408) the identified telephony devices (906) available to a user (408), the locations (962) of the plurality of devices (906) available to the user (408), the routing preferences (465, 455), and the RFID identification. The method of FIG. 18, associating (356) with the user (408) the identified telephony devices (906) available to a user (408), the locations (962) of the plurality of devices (906) available to the user (408), the routing preferences (456, 455), and the RFID identification creates a user account for the user. A user account (120) may be stored in a database within the networked environment or may be accessible to a communications application running on a communications gateway in the networked environment through an enterprise server.

In the example of FIG. 18, a user account (120) in an RFID based routing database is implemented through the use of relational data structures. For further explanation, FIG. 19 sets forth an exemplary relationship diagram of data structures useful in implementing a user account for telecommunications routing according to embodiments of the present invention. The example of FIG. 19 includes a user record (408). The exemplary user record (408) of FIG. 19 includes a user ID (410) uniquely identifying the user. The exemplary user record (408) of FIG. 19 also includes an identification of the user's RFID tag (414) uniquely identifying the RFID tag. The exemplary user record (408) of FIG. 19 includes a preference ID (412) identifying user preferences such as location-based routing preferences and device-based routing preferences discussed in more detail below.

Figure 19:
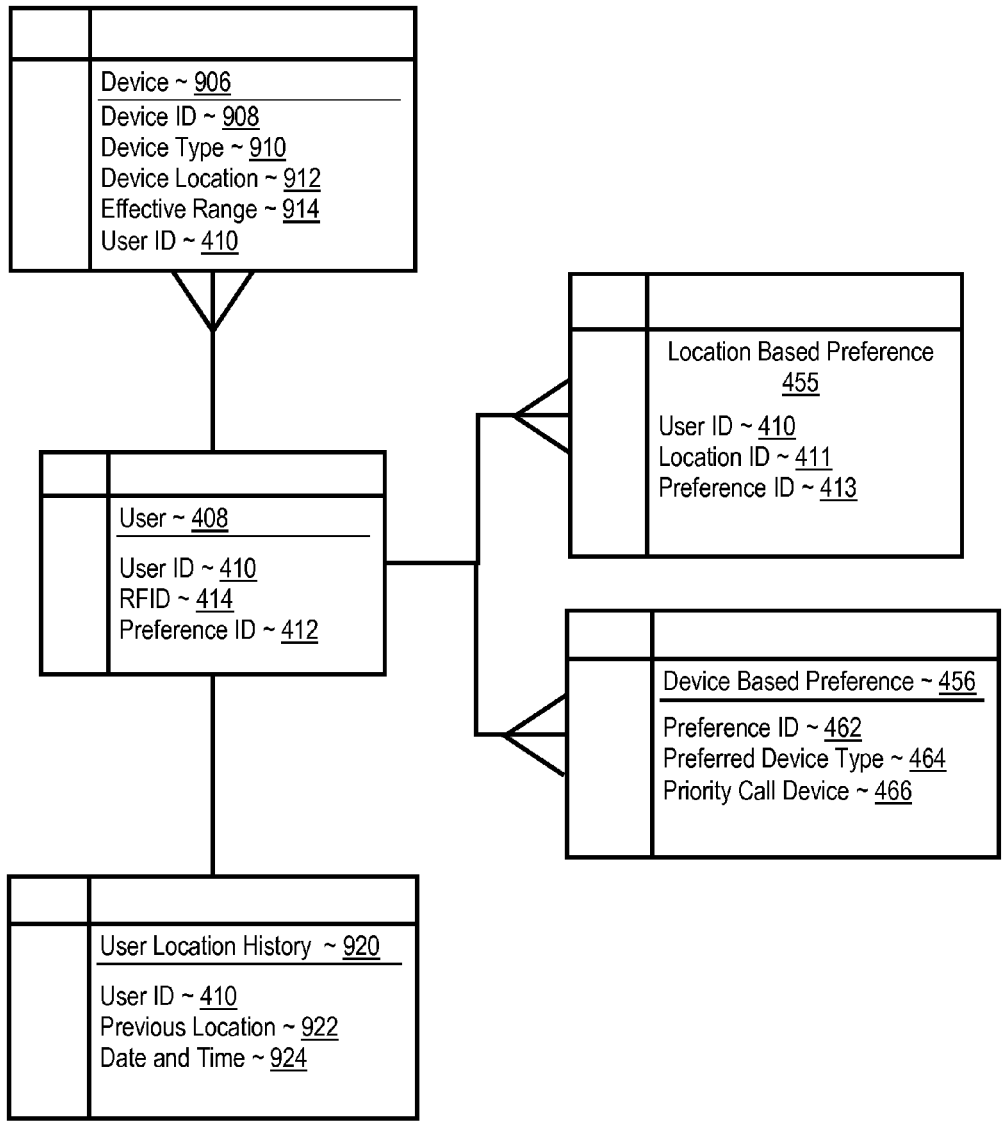
FIG. 19 sets forth an exemplary relationship diagram of data structures useful in implementing a user account for telecommunications routing.

The example of FIG. 19 includes a device record (906) related many-to-one to the user record (408) though the user ID field (410) used as a foreign key. The exemplary telephony device record (906) of FIG. 19 includes a device ID (908) uniquely representing the telephony device. The exemplary telephony device record (906) of FIG. 19 includes a device type (910) identifying the type of telephony device. Examples of device type include telephone, laptop, PDA, speakerphone, wireless telephone, wireline telephone, cellular telephone, and so on as will occur to those of skill in the art. The exemplary telephony device record (906) of FIG. 19 includes a device location (962) identifying the location of the device. A location of the device may be represented as a latitude and longitude, a room designation, a physical address, or any other representation of location that will occur to those of skill in the art. The exemplary telephony device record (906) of FIG. 19 also includes an effective range (914). An effective range describes the physical area for which the telephony device is effective. For example, a speaker phone may have a range of effectiveness of 10 square feet, while a wireline phone may have an effective range of only two square feet.

The example of FIG. 19 includes a user location history (920) related one-to-one to the user record through the user ID field (410) used as a foreign key. A user location history is a data structure containing identifications of previous locations of a user indexed by the date and time the user was at the previous location. The exemplary user location history of FIG. 19 includes a user ID (410) uniquely identifying the user location. The exemplary user location history (920) of FIG. 19 also includes a description or identification of the previous location (922). The description or identification of the previous location of the user may be a latitude and longitude, a room designation, a physical address or any other description or identification of a previous location that will occur to those of skill in the art.

The example of FIG. 19 includes a location-based preference record (455) related many-to-one to the user record (408) through the user ID field (410) and the preference ID field (413). The exemplary location-based preference record (455) of FIG. 19 includes a user ID (410) uniquely identifying the user. The exemplary location-based preference record (455) also includes a location ID (411) identifying the user location for which the location based routing preference is to be implemented. The location ID (411) may be a latitude and longitude, a room designation, a physical address, or a range of locations represented in any manner as will occur to those of skill in the art. The exemplary location-based preference record (455) also includes a preference ID (413) uniquely identifying the routing preference associated with the location ID.

The example of FIG. 19 includes a device-based preference record (456) related many-to-one to the user record (408) through the user ID field (410) and the preference ID field (413). The exemplary device based preference record (456) of FIG. 19 includes a preference ID field (462) that uniquely identifies the preference. The exemplary device based preference record (456) of FIG. 19 also includes a preferred device type field (464) that includes preferences for telephony devices in dependence of device type. Examples of device types include wireless devices, wireline devices, wall mounted devices, mobile devices, devices with speakers, and so on as will occur to those of skill in the art. The exemplary device based preference record (456) of FIG. 19 includes a priority call device (466) field that includes a device type or device identification of a device for priority calls. For example, a priority call device may include a user's mobile phone and in such cases only high priory calls are routed to the mobile phone.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for rerouting telecommunications to a user, the method comprising:
    receiving a plurality of RFID signals from an RFID tag located with the user;
    anticipating a user's future location in dependence upon the RFID signals, wherein the anticipating of the user's future location in dependence upon the RFID signals further comprises:
        determining a first user location;
        determining a second user location; and
        predicting the user's future location in dependence upon the first user location and the second user location;
    selecting a telephony device in dependence upon the anticipated future location; and
    rerouting an ongoing call to the selected telephony device.

2. The method of claim 1 wherein selecting a telephony device in dependence upon the anticipated future location further comprises identifying device-based routing preferences for the user.

3. The method of claim 1 wherein determining a first user location further comprises:
    receiving a plurality of RFID signals from the RFID tag at a plurality of RFID reader locations; and
    determining the location of the user in dependence upon the RFID reader locations and a rule.

4. The method of claim 1 further comprising:
    maintaining a user location history containing identifications of previous locations of the user including date and time information for the locations;
    wherein the predicting of the user's future location is based on the user location history in addition to the first user location and the second user location.

5. The method of claim 1 wherein the predicting of the user's future location is based on near field sensing.

6. A method for rerouting telecommunications to a user, the method comprising:
    receiving a plurality of RFID signals from an RFID tag located with the user;
    determining a first user location, determining the first user location further comprises:
        receiving the plurality of RFID signals at a plurality of RFID reader locations from the RFID tag;
        determining for each RFID reader an area of possible locations of the RFID tag; and
        determining the intersection of the areas of possible locations;
    anticipating the user's future location in dependence upon the RFID signals;
    selecting a telephony device in dependence upon the anticipated future location, wherein the selecting of the telephony device in dependence upon the anticipated future location further comprises identifying location based routing preferences for the user; and
    rerouting an ongoing call to the selected telephony device.

7. The method of claim 6 further comprising:
    maintaining a user location history containing identifications of previous locations of the user including date and time information for the locations;
    wherein the anticipating of the user's future location is based on the user location history in addition to the RFID signals.

8. A method for rerouting telecommunications to a user, the method comprising:
    receiving a plurality of RFID signals from an RFID tag located with the user;
    anticipating a user's future location in dependence upon the RFID signals;
    receiving a call;
    determining that the call is intended for the user; and
    selecting a telephony device in dependence upon the anticipated future location; and
    rerouting an ongoing call to the selected telephony device.

9. The method of claim 8 wherein determining that the call is intended for the user further comprises:
    prompting the caller for the name of the user; and
    receiving from the caller the name of the user.

10. The method of claim 8 further comprising:
    maintaining a user location history containing identifications of previous locations of the user including date and time information for the locations;

wherein the anticipating of the user's future location is based on the user location history in addition to the RFID signals.

11. The method of claim 8 wherein the anticipating of the user's future location is based on near field sensing.

12. A system for rerouting telecommunications to a user, the system comprising:
means for receiving a plurality of RFID signals from an RFID tag located with the user;
means for anticipating a user's future location in dependence upon the RFID signals, wherein said means for anticipating the user's future location in dependence upon the RFID signals further comprises:
means for determining a first user location;
means for determining a second user location; and
means for predicting a user's future location in dependence upon the first user location and the second user location;
means for selecting a telephony device in dependence upon the anticipated future location; and
means for rerouting an ongoing call to the selected telephony device.

13. The system of claim 12 wherein means for selecting a telephony device in dependence upon the anticipated future location further comprises means for identifying device-based routing preferences for the user.

14. The system of claim 12 wherein means for determining a first user location further comprises:
means for receiving a plurality of RFID signals from the RFID tag at a plurality of RFID reader locations; and
means for determining the location of the user in dependence upon the RFID reader locations and a rule.

15. The system of claim 12 further comprising:
means for maintaining a user location history containing identifications of previous locations of the user including date and time information for the locations;
wherein the means for predicting the user's future location bases the user's future location on the user location history in addition to the first user location and the second user location.

16. The system of claim 12 wherein the means for predicting of the user's future location is based on near field sensing.

17. A system for rerouting telecommunications to a user, the system comprising:
means for receiving a plurality of RFID signals from an RFID tag located with the user;
determining a first user location, wherein means for determining a first user location further comprises:
means for receiving a plurality of RFID signals at a plurality of RFID reader locations from the RFID tag;
means for determining for each RFID reader an area of possible locations of the RFID tag; and
means for determining the intersection of the areas of possible locations,
means for anticipating a user's future location in dependence upon the RFID signals;
means for selecting a telephony device in dependence upon the anticipated future location, wherein the means for selecting the telephony device in dependence upon the anticipated future location further comprises means for identifying location based routing preferences for the user; and
means for rerouting an ongoing call to the selected telephony device.

18. The system of claim 17 further comprising:
means for maintaining a user location history containing identifications of previous locations of the user including date and time information for the locations;
wherein the means for anticipating the user's future location bases the user's future location on the user location history in addition to the RFID signals.

19. A system for rerouting telecommunications to a user, the system the system comprising:
means for receiving a plurality of RFID signals from an RFID tag located with the user;
means for anticipating a user's future location in dependence upon the RFID signals;
means for selecting a telephony device in dependence upon the anticipated future location; and
means for receiving a call;
means for determining that the call is intended for the user; and
means for rerouting an ongoing call to the selected telephony device.

20. The system of claim 19 wherein means for determining that the call is intended for the user further comprises:
means for prompting the caller for the name of the user; and
means for receiving from the caller the name of the user.

21. The system of claim 19 further comprising:
means for maintaining a user location history containing identifications of previous locations of the user including date and time information for the locations;
wherein the means for anticipating the user's future location bases the user's future location on the user location history in addition to the RFID signals.

22. The system of claim 19 wherein the anticipating of the user's future location is based on near field sensing.

23. A computer program product for rerouting telecommunications to a user, the computer program product comprising:
a non-transitory recording medium;
means, recorded on the non-transitory recording medium, for receiving a plurality of RFID signals from an RFID tag located with the user;
means, recorded on the non-transitory recording medium, for anticipating a user's future location in dependence upon the RFID signals, wherein the means, recorded on the recording medium, for anticipating the user's future location in dependence upon the RFID signals further comprises:
means, recorded on the non-transitory recording medium, for determining a first user location;
means, recorded on the non-transitory recording medium, for determining a second user location; and
means, recorded on the non-transitory recording medium, for predicting a user's future location in dependence upon the first user location and the second user location;
means, recorded on the non-transitory recording medium, for selecting a telephony device in dependence upon the anticipated future location; and
means, recorded on the non-transitory recording medium, for rerouting an ongoing call to the selected telephony device.

24. The computer program product of claim 23 wherein the means, recorded on the non-transitory recording medium, for selecting a telephony device in dependence upon the anticipated future location further comprises means, recorded on the non-transitory recording medium, for identifying device-based routing preferences for the user.

25. The computer program product of claim 23 wherein the means, recorded on the non-transitory recording medium, for determining a first user location further comprises:
- means, recorded on the non-transitory recording medium, for receiving a plurality of RFID signals from the RFID tag at a plurality of RFID reader locations; and
- means, recorded on the non-transitory recording medium, for determining the location of the user in dependence upon the RFID reader locations and a rule.

26. The computer program product of claim 23 further comprising:
- means, recorded on the non-transitory recording medium, for maintaining a user location history containing identifications of previous locations of the user including date and time information for the locations;
- wherein the means, recorded on the non-transitory recording medium, for predicting a user's future location uses the user location history in addition to the first user location and the second user location.

27. The computer program product of claim 23 wherein the predicting of the user's future location is based on near field sensing.

28. A computer program product for rerouting telecommunications to a user, the computer program product comprising:
- a non-transitory recording medium;
- means, recorded on the non-transitory recording medium, for receiving a plurality of RFID signals from an RFID tag located with the user;
- means, recorded on the non-transitory recording medium, for determining a first user location, wherein the means, recorded on the non-transitory recording medium, for determining the first user location further comprises:
  - means, recorded on the non-transitory recording medium, for receiving a plurality of RFID signals at a plurality of RFID reader locations from the RFID tag;
  - means, recorded on the recording non-transitory medium, for determining for each RFID reader an area of possible locations of the RFID tag; and
  - means, recorded on the non-transitory recording medium, for determining the intersection of the areas of possible locations;
- means, recorded on the non-transitory recording medium, for anticipating a user's future location in dependence upon the RFID signals;
- means, recorded on the non-transitory recording medium, for selecting a telephony device in dependence upon the anticipated future location, wherein the means, recorded on the non-transitory recording medium, for selecting the telephony device in dependence upon the anticipated future location further comprises means, recorded on the non-transitory recording medium, for identifying location based routing preferences for the user; and
- means, recorded on the non-transitory recording medium, for rerouting an ongoing call to the selected telephony device.

29. The computer program product of claim 28 further comprising:
- means, recorded on the non-transitory recording medium, for maintaining a user location history containing identifications of previous locations of the user including date and time information for the locations;
- wherein the means, recorded on the non-transitory recording medium, for anticipating the user's future location uses the user location history in addition to the RFID signals.

30. The computer program product of claim 28 wherein the anticipating of the user's future location is based on near field sensing.

31. A computer program product for rerouting telecommunications to a user, the computer program product comprising:
- a non-transitory recording medium;
- means, recorded on the non-transitory recording medium, for receiving a plurality of RFID signals from an RFID tag located with the user;
- means, recorded on the non-transitory recording medium, for anticipating a user's future location in dependence upon the RFID signals;
- means, recorded on the non-transitory recording medium, for receiving a call;
- means, recorded on the non-transitory recording medium, for determining that the call is intended for the user; and
- means, recorded on the non-transitory recording medium, for selecting a telephony device in dependence upon the anticipated future location; and
- means, recorded on the non-transitory recording medium, for rerouting an ongoing call to the selected telephony device.

32. The computer program product of claim 31 wherein the means, recorded on the non-transitory recording medium, for determining that the call is intended for the user further comprises:
- means, recorded on the non-transitory recording medium, for prompting the caller for the name of the user; and
- means, recorded on the non-transitory recording medium, for receiving from the caller the name of the user.

33. The computer program product of claim 31 further comprising:
- means, recorded on the non-transitory recording medium, for maintaining a user location history containing identifications of previous locations of the user including date and time information for the locations;
- wherein the means, recorded on the non-transitory recording medium, for anticipating the user's future location uses the user location history in addition to the RFID signals.

* * * * *